(12) United States Patent
Olarig

(10) Patent No.: US 12,541,480 B2
(45) Date of Patent: Feb. 3, 2026

(54) SELF-CONFIGURING SSD MULTI-PROTOCOL SUPPORT IN HOST-LESS ENVIRONMENT

(71) Applicant: Samsung Electronics Co., Ltd., Suwon-si (KR)

(72) Inventor: Sompong Paul Olarig, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/206,079

(22) Filed: Jun. 5, 2023

(65) Prior Publication Data

US 2023/0325343 A1    Oct. 12, 2023

Related U.S. Application Data

(63) Continuation of application No. 16/844,995, filed on Apr. 9, 2020, now Pat. No. 11,983,138, which is a continuation of application No. 15/256,495, filed on Sep. 2, 2016.

(60) Provisional application No. 62/366,622, filed on Jul. 26, 2016.

(51) Int. Cl.
| | |
|---|---|
| *G06F 13/42* | (2006.01) |
| *G06F 13/40* | (2006.01) |
| *G06F 15/16* | (2006.01) |
| *G06F 15/173* | (2006.01) |
| *H04L 49/90* | (2022.01) |

(52) U.S. Cl.
CPC ...... *G06F 13/4282* (2013.01); *G06F 13/4022* (2013.01); *G06F 15/161* (2013.01); *G06F 15/17331* (2013.01); *H04L 49/9068* (2013.01)

(58) Field of Classification Search
None
See application file for complete search history.

(56) References Cited

U.S. PATENT DOCUMENTS

| | | | |
|---|---|---|---|
| 5,299,193 | A | 3/1994 | Szczepanek |
| 6,167,470 | A | 12/2000 | Ishii |
| 6,295,567 | B1 | 9/2001 | Bassman et al. |
| (Continued) | | | |

FOREIGN PATENT DOCUMENTS

| | | |
|---|---|---|
| CN | 1641568 A | 7/2005 |
| CN | 101847429 B | 5/2012 |
| (Continued) | | |

OTHER PUBLICATIONS

US 11,923,992 B2, 03/2024, Olarig et al. (withdrawn)
(Continued)

*Primary Examiner* — Henry Tsai
*Assistant Examiner* — Christopher A Bartels
(74) *Attorney, Agent, or Firm* — Renaissance IP Law Group LLP

(57) ABSTRACT

A device that may configure itself is disclosed. The device may include an interface that may be used for communications with a chassis. The interface may support a plurality of transport protocols. The device may include a Vital Product Data (VPD) reading logic to read a VPD from the chassis and a built-in self-configuration logic to configure the interface to use one of the transport protocols and to disable alternative transport protocols, responsive to the VPD.

13 Claims, 14 Drawing Sheets

(56) References Cited

U.S. PATENT DOCUMENTS

| | | | |
|---|---|---|---|
| 6,345,303 B1 | 2/2002 | Knauerhase et al. | |
| 6,427,198 B1 | 7/2002 | Berglund et al. | |
| 6,463,499 B1 | 10/2002 | Wakeley | |
| 6,611,863 B1 | 8/2003 | Banginwar | |
| 6,662,119 B1 | 12/2003 | Mitchell | |
| 6,717,576 B1 * | 4/2004 | Duluk, Jr. | G06T 11/40 345/506 |
| 7,031,838 B1 * | 4/2006 | Young | G06Q 50/00 702/5 |
| 7,107,253 B1 | 9/2006 | Sumner et al. | |
| 7,120,759 B2 | 10/2006 | Chiu et al. | |
| 7,143,153 B1 | 11/2006 | Black et al. | |
| 7,237,036 B2 * | 6/2007 | Boucher | H04L 69/12 709/236 |
| 7,249,173 B2 | 7/2007 | Nicolson | |
| 7,409,567 B2 | 8/2008 | Hammes et al. | |
| 7,411,947 B2 | 8/2008 | Mizuno et al. | |
| 7,512,585 B2 | 3/2009 | Agarwal et al. | |
| 7,536,486 B2 | 5/2009 | Sadovsky et al. | |
| 7,620,854 B2 | 11/2009 | Kuttan et al. | |
| 7,788,428 B2 | 8/2010 | Melin | |
| 7,873,700 B2 | 1/2011 | Pawlowski et al. | |
| 7,882,393 B2 | 2/2011 | Grimes et al. | |
| 7,944,812 B2 | 5/2011 | Carlson et al. | |
| 8,065,347 B1 | 11/2011 | DeMeyer et al. | |
| 8,180,862 B2 | 5/2012 | Baker et al. | |
| 8,327,187 B1 * | 12/2012 | Metcalf | G06F 9/544 714/10 |
| 8,396,981 B1 | 3/2013 | Lee et al. | |
| 8,599,863 B2 | 12/2013 | Davis | |
| 8,667,224 B1 | 3/2014 | Yu et al. | |
| 8,750,380 B2 | 6/2014 | Matsubayashi | |
| 8,754,681 B2 | 6/2014 | Zhu et al. | |
| 8,832,327 B1 | 9/2014 | Lin | |
| 8,862,791 B2 | 10/2014 | Tao et al. | |
| 8,887,144 B1 * | 11/2014 | Marr | G06F 9/4416 717/172 |
| 8,943,234 B1 | 1/2015 | Voorhees et al. | |
| 8,949,517 B2 | 2/2015 | Cohen et al. | |
| 8,953,644 B2 | 2/2015 | Chandra et al. | |
| 8,998,636 B2 | 4/2015 | Gomez et al. | |
| 9,037,786 B2 | 5/2015 | Asnaashari et al. | |
| 9,047,222 B2 | 6/2015 | Chandra et al. | |
| 9,092,321 B2 | 7/2015 | Salessi | |
| 9,244,865 B2 | 1/2016 | Hutchison et al. | |
| 9,244,877 B2 | 1/2016 | Yang et al. | |
| 9,253,275 B2 | 2/2016 | Bhogal et al. | |
| 9,280,357 B2 | 3/2016 | Shaver et al. | |
| 9,280,504 B2 | 3/2016 | Ben-Michael et al. | |
| 9,389,805 B2 | 7/2016 | Cohen et al. | |
| 9,400,749 B1 | 7/2016 | Kuzmin et al. | |
| 9,401,879 B1 | 7/2016 | Klemin et al. | |
| 9,430,412 B2 | 8/2016 | Huang | |
| 9,432,298 B1 * | 8/2016 | Smith | H04L 49/9057 |
| 9,460,042 B2 | 10/2016 | Iskandar et al. | |
| 9,465,756 B2 | 10/2016 | Bennett | |
| 9,503,309 B2 | 11/2016 | Chai et al. | |
| 9,648,148 B2 | 5/2017 | Rimmer et al. | |
| 9,653,124 B2 | 5/2017 | Heyd et al. | |
| 9,734,093 B2 | 8/2017 | Khemani et al. | |
| 9,734,106 B2 | 8/2017 | Kotzur et al. | |
| 9,785,346 B2 | 10/2017 | Yost | |
| 9,785,355 B2 | 10/2017 | Huang | |
| 9,785,356 B2 | 10/2017 | Huang | |
| 9,798,636 B2 | 10/2017 | Breakstone et al. | |
| 9,811,481 B2 | 11/2017 | Bhatia et al. | |
| 9,830,082 B1 | 11/2017 | Srinivasan et al. | |
| 9,842,084 B2 | 12/2017 | Friedman et al. | |
| 9,904,330 B2 | 2/2018 | Schuette et al. | |
| 9,906,596 B2 | 2/2018 | Sikdar | |
| 9,934,173 B1 | 4/2018 | Sakalley et al. | |
| 9,934,183 B2 | 4/2018 | Brassac et al. | |
| 9,952,634 B2 | 4/2018 | Samper et al. | |
| 9,959,240 B2 | 5/2018 | Mundt | |
| 9,965,367 B2 | 5/2018 | Shih | |
| 9,990,313 B2 | 6/2018 | Monji et al. | |
| 10,013,388 B1 | 7/2018 | Wang | |
| 10,019,388 B2 | 7/2018 | Long et al. | |
| 10,061,852 B1 | 8/2018 | Plenderleith | |
| 10,063,073 B2 | 8/2018 | Yao et al. | |
| 10,063,638 B2 | 8/2018 | Huang | |
| 10,101,764 B2 | 10/2018 | Chou et al. | |
| 10,108,450 B2 | 10/2018 | Pinto et al. | |
| 10,114,778 B2 | 10/2018 | Worley et al. | |
| 10,140,063 B2 | 11/2018 | Worley et al. | |
| 10,162,784 B2 | 12/2018 | Bassett et al. | |
| 10,162,793 B1 * | 12/2018 | Bshara | H04L 69/16 |
| 10,180,889 B2 | 1/2019 | Cannata et al. | |
| 10,206,297 B2 | 2/2019 | Breakstone et al. | |
| 10,223,313 B2 | 3/2019 | Shih | |
| 10,223,316 B2 | 3/2019 | Mataya et al. | |
| 10,235,313 B2 | 3/2019 | Lee et al. | |
| 10,255,215 B2 | 4/2019 | Breakstone et al. | |
| 10,257,080 B1 | 4/2019 | Kusam et al. | |
| 10,275,356 B2 | 4/2019 | Chou et al. | |
| 10,289,517 B2 | 5/2019 | Beerens | |
| 10,289,588 B2 | 5/2019 | Chu et al. | |
| 10,311,003 B2 | 6/2019 | Pamley et al. | |
| 10,318,443 B2 | 6/2019 | Su | |
| 10,346,041 B2 | 7/2019 | Olarig et al. | |
| 10,372,648 B2 | 8/2019 | Qiu | |
| 10,372,659 B2 * | 8/2019 | Olarig | G06F 13/4234 |
| 10,394,723 B2 | 8/2019 | Yang et al. | |
| 10,409,524 B1 * | 9/2019 | Branover | G06F 3/0634 |
| 10,409,751 B2 * | 9/2019 | Grobelny | G06F 13/4081 |
| 10,452,576 B2 | 10/2019 | Stuhlsatz | |
| 10,467,163 B1 | 11/2019 | Malwankar et al. | |
| 10,467,170 B2 | 11/2019 | McKnight | |
| 10,474,589 B1 | 11/2019 | Raskin | |
| 10,521,378 B2 * | 12/2019 | Fischer | G06F 13/287 |
| 10,560,550 B1 | 2/2020 | Xue et al. | |
| 10,592,144 B2 | 3/2020 | Roberts et al. | |
| 10,733,137 B2 | 8/2020 | Kachare et al. | |
| 10,795,843 B2 | 10/2020 | Olarig et al. | |
| 10,817,443 B2 * | 10/2020 | Mao | G06F 13/20 |
| 10,866,911 B2 | 12/2020 | Qiu et al. | |
| 10,901,927 B2 | 1/2021 | Fischer et al. | |
| 10,909,818 B2 | 2/2021 | Zhao et al. | |
| 10,929,327 B1 | 2/2021 | Schrempp et al. | |
| 10,942,666 B2 | 3/2021 | Pydipaty et al. | |
| 10,990,553 B2 | 4/2021 | Rust et al. | |
| 11,042,496 B1 | 6/2021 | BeSerra et al. | |
| 11,113,046 B1 | 9/2021 | Bowen et al. | |
| 11,126,352 B2 | 9/2021 | Olarig et al. | |
| 11,126,583 B2 | 9/2021 | Olarig et al. | |
| 11,347,740 B2 | 5/2022 | Moshe et al. | |
| 11,669,481 B2 * | 6/2023 | Jen | G06F 13/4295 710/313 |
| 11,983,405 B2 | 5/2024 | Olarig et al. | |
| 11,983,406 B2 | 5/2024 | Olarig et al. | |
| 11,989,413 B2 | 5/2024 | Olarig et al. | |
| 2002/0087887 A1 | 7/2002 | Busam et al. | |
| 2002/0095491 A1 | 7/2002 | Edmonds et al. | |
| 2002/0123365 A1 | 9/2002 | Thorson et al. | |
| 2003/0058818 A1 | 3/2003 | Wilkes et al. | |
| 2004/0073912 A1 | 4/2004 | Meza | |
| 2004/0111590 A1 | 6/2004 | Klein, Jr. | |
| 2004/0147281 A1 | 7/2004 | Holcombe et al. | |
| 2004/0153844 A1 | 8/2004 | Ghose et al. | |
| 2004/0153851 A1 | 8/2004 | Venugopal et al. | |
| 2004/0255014 A1 | 12/2004 | Motoyama et al. | |
| 2005/0025125 A1 | 2/2005 | Kwan | |
| 2005/0060442 A1 | 3/2005 | Beverly et al. | |
| 2005/0120157 A1 | 6/2005 | Chen et al. | |
| 2005/0251609 A1 | 11/2005 | Chou et al. | |
| 2006/0059287 A1 | 3/2006 | Rivard et al. | |
| 2006/0095625 A1 | 5/2006 | Wootten et al. | |
| 2006/0098681 A1 | 5/2006 | Cafiero et al. | |
| 2006/0136621 A1 | 6/2006 | Tung et al. | |
| 2006/0202950 A1 | 9/2006 | Lee et al. | |
| 2007/0077553 A1 | 4/2007 | Bentwich | |
| 2008/0003845 A1 | 1/2008 | Hong et al. | |
| 2008/0288708 A1 | 11/2008 | Hsueh | |

(56) References Cited

U.S. PATENT DOCUMENTS

| | | |
|---|---|---|
| 2009/0003361 A1 | 1/2009 | Bakthavathsalam |
| 2009/0073896 A1 | 3/2009 | Gillingham et al. |
| 2009/0077478 A1 | 3/2009 | Gillingham et al. |
| 2009/0217188 A1 | 8/2009 | Alexander et al. |
| 2009/0222733 A1 | 9/2009 | Basham et al. |
| 2009/0259364 A1 | 10/2009 | Vollmer et al. |
| 2010/0077067 A1 | 3/2010 | Strole |
| 2010/0100858 A1 | 4/2010 | Schipper |
| 2010/0106836 A1 | 4/2010 | Schreyer et al. |
| 2010/0169512 A1 | 7/2010 | Matton et al. |
| 2011/0131380 A1 | 6/2011 | Rallens et al. |
| 2011/0151858 A1 | 6/2011 | Lai |
| 2011/0187829 A1* | 8/2011 | Nakajima ............... H04N 13/20 348/46 |
| 2012/0056728 A1 | 3/2012 | Erdmann et al. |
| 2012/0102580 A1 | 4/2012 | Bealkowski |
| 2012/0144136 A1 | 6/2012 | Augenstein et al. |
| 2012/0154375 A1* | 6/2012 | Zhang ................... G06F 9/4411 345/522 |
| 2012/0182866 A1 | 7/2012 | Vinayagam et al. |
| 2012/0207156 A1 | 8/2012 | Srinivasan et al. |
| 2012/0311654 A1 | 12/2012 | Dougherty, III et al. |
| 2012/0319750 A1 | 12/2012 | Zhu et al. |
| 2013/0054901 A1* | 2/2013 | Biswas ................ G06F 13/1642 711/E12.001 |
| 2013/0073895 A1 | 3/2013 | Cohen |
| 2013/0097352 A1 | 4/2013 | Chu |
| 2013/0117503 A1 | 5/2013 | Nellans et al. |
| 2013/0117601 A1 | 5/2013 | Ackaret et al. |
| 2013/0117766 A1 | 5/2013 | Bax et al. |
| 2013/0179624 A1 | 7/2013 | Lambert et al. |
| 2013/0198311 A1 | 8/2013 | Tamir et al. |
| 2013/0198312 A1 | 8/2013 | Tamir et al. |
| 2013/0242991 A1 | 9/2013 | Basso et al. |
| 2013/0282953 A1 | 10/2013 | Orme et al. |
| 2013/0304979 A1 | 11/2013 | Zimmer et al. |
| 2013/0311795 A1 | 11/2013 | Cong et al. |
| 2013/0318371 A1 | 11/2013 | Hormuth |
| 2013/0325998 A1* | 12/2013 | Hormuth ................. H04L 41/06 709/212 |
| 2014/0032641 A1 | 1/2014 | Du |
| 2014/0040639 A1 | 2/2014 | Raam |
| 2014/0052928 A1 | 2/2014 | Shimoi |
| 2014/0122746 A1 | 5/2014 | Shaver et al. |
| 2014/0195634 A1 | 7/2014 | Kishore et al. |
| 2014/0195711 A1 | 7/2014 | Bhatia et al. |
| 2014/0201394 A1 | 7/2014 | Wagstaff |
| 2014/0208004 A1 | 7/2014 | Cohen et al. |
| 2014/0244888 A1 | 8/2014 | Kallickal |
| 2014/0258679 A1 | 9/2014 | McGee |
| 2014/0281171 A1 | 9/2014 | Canepa |
| 2014/0281458 A1 | 9/2014 | Ravimohan et al. |
| 2014/0317206 A1 | 10/2014 | Lomelino et al. |
| 2014/0330995 A1 | 11/2014 | Levy et al. |
| 2014/0344431 A1 | 11/2014 | Hsu et al. |
| 2014/0344488 A1* | 11/2014 | Flynn ................... G06F 13/1673 710/52 |
| 2014/0344492 A1 | 11/2014 | Patwa et al. |
| 2015/0006758 A1 | 1/2015 | Holtman et al. |
| 2015/0039815 A1* | 2/2015 | Klein ..................... G06F 3/065 711/103 |
| 2015/0067188 A1 | 3/2015 | Chakhaiyar |
| 2015/0086017 A1 | 3/2015 | Taylor et al. |
| 2015/0091927 A1* | 4/2015 | Cote ...................... G06T 1/60 345/547 |
| 2015/0106660 A1 | 4/2015 | Chumbalkar et al. |
| 2015/0120874 A1 | 4/2015 | Kim et al. |
| 2015/0120971 A1 | 4/2015 | Bae et al. |
| 2015/0138900 A1 | 5/2015 | Choi |
| 2015/0143018 A1 | 5/2015 | Kim et al. |
| 2015/0169231 A1 | 6/2015 | Kanigicherla et al. |
| 2015/0178095 A1 | 6/2015 | Balakrishnan et al. |
| 2015/0181760 A1 | 6/2015 | Stephens |
| 2015/0205541 A1 | 7/2015 | Nishtala et al. |
| 2015/0234815 A1 | 8/2015 | Slik |
| 2015/0254088 A1 | 9/2015 | Chou et al. |
| 2015/0255130 A1 | 9/2015 | Lee et al. |
| 2015/0261434 A1 | 9/2015 | Kagan et al. |
| 2015/0281126 A1* | 10/2015 | Regula ................... H04L 67/55 709/212 |
| 2015/0286599 A1 | 10/2015 | Hershberger |
| 2015/0301757 A1 | 10/2015 | Iwata et al. |
| 2015/0301964 A1 | 10/2015 | Brinicombe et al. |
| 2015/0304423 A1 | 10/2015 | Satoyama et al. |
| 2015/0317176 A1 | 11/2015 | Hussain et al. |
| 2015/0324312 A1 | 11/2015 | Jacobson et al. |
| 2015/0331473 A1 | 11/2015 | Jreji et al. |
| 2015/0350096 A1 | 12/2015 | Dinc et al. |
| 2015/0370661 A1 | 12/2015 | Swanson et al. |
| 2015/0370665 A1 | 12/2015 | Cannata et al. |
| 2015/0376840 A1 | 12/2015 | Shih |
| 2015/0381734 A1 | 12/2015 | Ebihara et al. |
| 2016/0004879 A1 | 1/2016 | Fisher et al. |
| 2016/0062936 A1 | 3/2016 | Brassac et al. |
| 2016/0077841 A1 | 3/2016 | Lambert et al. |
| 2016/0077994 A1* | 3/2016 | Hamada ............... G06F 13/4022 710/313 |
| 2016/0085718 A1 | 3/2016 | Huang |
| 2016/0092390 A1 | 3/2016 | Grothen et al. |
| 2016/0094619 A1 | 3/2016 | Khan et al. |
| 2016/0118121 A1 | 4/2016 | Kelly et al. |
| 2016/0127468 A1 | 5/2016 | Malwankar et al. |
| 2016/0127492 A1 | 5/2016 | Malwankar et al. |
| 2016/0146754 A1 | 5/2016 | Prasad et al. |
| 2016/0147446 A1 | 5/2016 | Ghosh |
| 2016/0188313 A1 | 6/2016 | Dubal et al. |
| 2016/0246754 A1 | 8/2016 | Rao et al. |
| 2016/0259597 A1 | 9/2016 | Worley et al. |
| 2016/0261375 A1 | 9/2016 | Roethig et al. |
| 2016/0283428 A1 | 9/2016 | Guddeti |
| 2016/0306723 A1 | 10/2016 | Lu et al. |
| 2016/0306768 A1 | 10/2016 | Mataya |
| 2016/0328344 A1 | 11/2016 | Jose et al. |
| 2016/0328347 A1 | 11/2016 | Worley et al. |
| 2016/0337272 A1* | 11/2016 | Berman ................. H04L 49/70 |
| 2016/0342547 A1 | 11/2016 | Liss et al. |
| 2016/0366071 A1 | 12/2016 | Chandran et al. |
| 2016/0378401 A1 | 12/2016 | Savic et al. |
| 2017/0018149 A1 | 1/2017 | Shih |
| 2017/0038804 A1 | 2/2017 | Shows et al. |
| 2017/0046097 A1 | 2/2017 | Jayaraman et al. |
| 2017/0063965 A1 | 3/2017 | Grenader |
| 2017/0068268 A1 | 3/2017 | Giriyappa et al. |
| 2017/0068628 A1 | 3/2017 | Calciu et al. |
| 2017/0068630 A1 | 3/2017 | Iskandar et al. |
| 2017/0102510 A1* | 4/2017 | Faw ..................... H05K 7/1492 |
| 2017/0105313 A1* | 4/2017 | Shedd ................. H05K 7/20309 |
| 2017/0168943 A1 | 6/2017 | Chou et al. |
| 2017/0168970 A1* | 6/2017 | Sajeepa ................. G06F 13/24 |
| 2017/0185554 A1 | 6/2017 | Fricker |
| 2017/0187629 A1 | 6/2017 | Shalev et al. |
| 2017/0206034 A1 | 7/2017 | Fetik |
| 2017/0262029 A1 | 9/2017 | Nelson et al. |
| 2017/0269871 A1 | 9/2017 | Khan et al. |
| 2017/0270001 A1 | 9/2017 | Suryanarayana et al. |
| 2017/0270060 A1 | 9/2017 | Gupta et al. |
| 2017/0286305 A1 | 10/2017 | Kalwitz |
| 2017/0315752 A1 | 11/2017 | Colgrove et al. |
| 2017/0317901 A1 | 11/2017 | Agrawal et al. |
| 2017/0344259 A1 | 11/2017 | Freyensee et al. |
| 2017/0344294 A1 | 11/2017 | Mishra et al. |
| 2017/0357299 A1 | 12/2017 | Shabbir et al. |
| 2017/0357515 A1 | 12/2017 | Bower, III et al. |
| 2018/0004685 A1 | 1/2018 | Bhatt et al. |
| 2018/0004695 A1 | 1/2018 | Chu et al. |
| 2018/0019896 A1 | 1/2018 | Paquet et al. |
| 2018/0032462 A1 | 2/2018 | Olarig et al. |
| 2018/0032463 A1 | 2/2018 | Olarig et al. |
| 2018/0032469 A1 | 2/2018 | Olarig et al. |
| 2018/0032471 A1 | 2/2018 | Olarig |
| 2018/0052745 A1 | 2/2018 | Marripudi et al. |
| 2018/0074717 A1 | 3/2018 | Olarig et al. |
| 2018/0074984 A1 | 3/2018 | Olarig et al. |

(56) References Cited

U.S. PATENT DOCUMENTS

| | | |
|---|---|---|
| 2018/0095904 A1 | 4/2018 | Bunker et al. |
| 2018/0101492 A1 | 4/2018 | Cho et al. |
| 2018/0131633 A1 | 5/2018 | Li |
| 2018/0173652 A1 | 6/2018 | Olarig et al. |
| 2018/0189084 A1* | 7/2018 | Alanis ............... G06F 9/455 |
| 2018/0210517 A1 | 7/2018 | Yun |
| 2018/0213669 A1 | 7/2018 | Kochukunju |
| 2018/0227369 A1 | 8/2018 | DuCray et al. |
| 2018/0267925 A1 | 9/2018 | Rees |
| 2018/0275919 A1 | 9/2018 | Chirumamilla et al. |
| 2018/0293197 A1 | 10/2018 | Grobelny et al. |
| 2018/0307650 A1 | 10/2018 | Kachare et al. |
| 2018/0335958 A1 | 11/2018 | Wu et al. |
| 2018/0349231 A1* | 12/2018 | Panda .............. G06F 11/0793 |
| 2018/0361237 A1* | 12/2018 | Perlman ............... A63F 13/12 |
| 2018/0365185 A1 | 12/2018 | Risinger et al. |
| 2018/0373609 A1 | 12/2018 | Beerens |
| 2019/0042424 A1 | 2/2019 | Nair |
| 2019/0087268 A1 | 3/2019 | Koltsidas et al. |
| 2019/0104632 A1 | 4/2019 | Nelson et al. |
| 2019/0140838 A1* | 5/2019 | Bernat ................ H04L 9/3247 |
| 2019/0196745 A1* | 6/2019 | Persson ............... G06F 13/28 |
| 2019/0205153 A1* | 7/2019 | Niestemski .......... G06F 9/5027 |
| 2019/0286584 A1 | 9/2019 | Olarig et al. |
| 2019/0339888 A1 | 11/2019 | Sasidharan et al. |
| 2020/0021492 A1* | 1/2020 | Ganguli ................ G06F 3/061 |
| 2020/0042217 A1 | 2/2020 | Roberts et al. |
| 2020/0117663 A1 | 4/2020 | Moshe et al. |
| 2020/0293916 A1 | 9/2020 | Li |
| 2020/0364303 A1* | 11/2020 | Liu ..................... G10L 15/16 |
| 2021/0255979 A1* | 8/2021 | Colenbrander ..... G06F 13/1668 |
| 2021/0342281 A1 | 11/2021 | Olarig et al. |
| 2022/0129383 A1 | 4/2022 | Kim et al. |
| 2022/0151022 A1* | 5/2022 | Chikkur Dattatraya ..................... H04L 69/323 |
| 2022/0188002 A1 | 6/2022 | Olarig |
| 2022/0206693 A1 | 6/2022 | Jung et al. |
| 2022/0303056 A1* | 9/2022 | Miyazaki ............. H04L 1/203 |
| 2023/0143642 A1* | 5/2023 | Takahashi .......... H04L 47/2475 370/230 |
| 2024/0045816 A1 | 2/2024 | Olarig et al. |

FOREIGN PATENT DOCUMENTS

| | | |
|---|---|---|
| CN | 103946824 A | 7/2014 |
| CN | 104025063 A | 9/2014 |
| CN | 104202197 A | 12/2014 |
| CN | 104572516 A | 4/2015 |
| CN | 104615577 A | 5/2015 |
| CN | 105260275 A | 1/2016 |
| CN | 105677595 A | 6/2016 |
| CN | 105912275 A | 8/2016 |
| CN | 103412769 B | 11/2017 |
| CN | 107659518 B | 11/2021 |
| EP | 2290497 A1 | 3/2011 |
| EP | 2843557 A1 | 3/2015 |
| GB | 2308904 A | 7/1997 |
| JP | 2001290752 A | 10/2001 |
| JP | 4257050 B2 | 4/2009 |
| JP | 2010146525 A | 7/2010 |
| JP | 2011048534 A | 3/2011 |
| JP | 2012506184 A | 3/2012 |
| JP | 2013041390 A | 2/2013 |
| JP | 2014241545 A | 12/2014 |
| JP | 2015049742 A | 3/2015 |
| JP | 2015191649 A | 11/2015 |
| JP | 2015194005 A | 11/2015 |
| JP | 2015532985 A | 11/2015 |
| JP | 2016037501 A | 3/2016 |
| JP | 2016045968 A | 4/2016 |
| JP | WO2015194005 A1 | 4/2017 |
| KR | 20050001307 A | 1/2005 |
| KR | 20090106469 A | 10/2009 |
| KR | 20120135205 A | 12/2012 |
| KR | 20150047785 A | 5/2015 |
| KR | 20150071898 A | 6/2015 |
| KR | 20160074659 A | 6/2016 |
| KR | 20180012191 A | 2/2018 |
| KR | 20180012201 A | 2/2018 |
| TW | 201445325 A | 12/2014 |
| WO | 2011144075 A3 | 11/2011 |
| WO | 2013077867 A1 | 5/2013 |
| WO | 2014209764 A1 | 12/2014 |
| WO | 2015049742 A1 | 4/2015 |
| WO | 2015191649 A1 | 12/2015 |
| WO | 2016037501 A1 | 3/2016 |
| WO | 2016085016 A1 | 6/2016 |

OTHER PUBLICATIONS

Office Action for U.S. Appl. No. 16/844,995, mailed Feb. 22, 2022.
Office Action for U.S. Appl. No. 16/844,995, mailed Sep. 4, 2020.
Office Action for U.S. Appl. No. 16/857,172, mailed Oct. 8, 2020.
Office Action for U.S. Appl. No. 16/921,923, mailed Oct. 28, 2020.
Office Action for U.S. Appl. No. 16/950,624, mailed Jan. 25, 2021.
Office Action for U.S. Appl. No. 17/022,075, mailed May 11, 2023.
Office Action for U.S. Appl. No. 17/022,075, mailed Oct. 15, 2021.
Office Action for U.S. Appl. No. 17/063,501, mailed Feb. 24, 2022.
Office Action for U.S. Appl. No. 17/063,501, mailed Jul. 15, 2021.
Office Action for U.S. Appl. No. 17/063,507, mailed Aug. 6, 2021.
Office Action for U.S. Appl. No. 17/063,507, mailed Mar. 17, 2022.
Office Action for U.S. Appl. No. 17/099,776, mailed Apr. 17, 2023.
Office Action for U.S. Appl. No. 17/099,776, mailed Sep. 24, 2021.
Office Action for U.S. Appl. No. 17/230,989, mailed Oct. 31, 2022.
Office Action for U.S. Appl. No. 17/376,145, mailed Sep. 30, 2022.
Office Action for U.S. Appl. No. 17/408,365, mailed Aug. 2, 2022.
Office Action for U.S. Appl. No. 17/868,734, mailed Feb. 14, 2023.
Office Action for U.S. Appl. No. 18/074,445, mailed Jul. 29, 2024.
Office Action for U.S. Appl. No. 18/106,477, mailed Jan. 11, 2024.
Office Action for U.S. Appl. No. 18/113,618, mailed Feb. 1, 2024.
SSD Form Factor Work Group, "Enterprise SSD Form Factor 1.0a", 2012, SSD Form Factor Work Group, pp. 1-55. (Year: 2012).
Supplemental Notice of Allowability for U.S. Appl. No. 17/099,776, mailed Aug. 17, 2023.
Supplemental Notice of Allowability for U.S. Appl. No. 17/099,776, mailed May 16, 2022.
Supplemental Notice of Allowability for U.S. Appl. No. 17/099,776, mailed Nov. 16, 2023.
Supplemental Notice of Allowability for U.S. Appl. No. 17/099,776, mailed Sep. 27, 2023.
Supplemental Notice of Allowability for U.S. Appl. No. 17/408,365, mailed Jan. 3, 2024.
Supplemental Notice of Allowability for U.S. Appl. No. 17/408,365, mailed Nov. 24, 2023.
Supplemental Notice of Allowability for U.S. Appl. No. 17/408,365, mailed Sep. 28, 2023.
Supplemental Notice of Allowability for U.S. Appl. No. 17/868,734, mailed Aug. 14, 2023.
Supplemental Notice of Allowability for U.S. Appl. No. 17/868,734, mailed Sep. 25, 2023.
Wikipedia, "SATA Express", (https://en.wikipedia.org/wiki/SATA_Express), retrieved May 2018, 6 pages.
Wikipedia, "SATA Express," (https://en.wikipedia.org/wiki/SATA_Express), retrieved Apr. 12, 2021, 6 pages.
Wikipedia, "U.2", (https://en.wikipedia.org/wiki/U.2), retreived May 2018, 3 pages.
Wikipedia, "U.2," (https://en.wikipedia.org/wiki/U.2), retrieved Apr. 12, 2021, 2 pages.
Corrected Notice of Allowability for U.S. Appl. No. 17/063,501, mailed Jun. 23, 2022.
Corrected Notice of Allowability for U.S. Appl. No. 17/063,501, mailed Nov. 21, 2022.
Corrected Notice of Allowability for U.S. Appl. No. 17/063,501, mailed Oct. 13, 2022.
Corrected Notice of Allowability for U.S. Appl. No. 17/063,507, mailed Aug. 16, 2023.

(56) References Cited

OTHER PUBLICATIONS

Corrected Notice of Allowability for U.S. Appl. No. 17/063,507, mailed Jan. 17, 2023.
Corrected Notice of Allowability for U.S. Appl. No. 17/063,507, mailed Jun. 1, 2023.
Corrected Notice of Allowability for U.S. Appl. No. 17/063,507, mailed Jun. 20, 2023.
Corrected Notice of Allowability for U.S. Appl. No. 17/063,507, mailed Mar. 1, 2023.
Corrected Notice of Allowability for U.S. Appl. No. 17/063,507, mailed Nov. 13, 2023.
Corrected Notice of Allowability for U.S. Appl. No. 17/063,507, mailed Nov. 30, 2022.
Corrected Notice of Allowability for U.S. Appl. No. 17/063,507, mailed Sep. 27, 2023.
Corrected Notice of Allowability for U.S. Appl. No. 17/099,776, mailed Aug. 24, 2022.
Corrected Notice of Allowability for U.S. Appl. No. 17/099,776, mailed Feb. 26, 2024.
Corrected Notice of Allowability for U.S. Appl. No. 17/099,776, mailed Jan. 9, 2024.
Corrected Notice of Allowability for U.S. Appl. No. 17/099,776, mailed Jul. 21, 2022.
Corrected Notice of Allowability for U.S. Appl. No. 17/099,776, mailed Jun. 20, 2022.
Corrected Notice of Allowability for U.S. Appl. No. 17/099,776, mailed Nov. 30, 2022.
Corrected Notice of Allowability for U.S. Appl. No. 17/099,776, mailed Oct. 19, 2022.
Corrected Notice of Allowability for U.S. Appl. No. 17/376,145, mailed Aug. 28, 2023.
Corrected Notice of Allowability for U.S. Appl. No. 17/376,145, mailed Dec. 8, 2023.
Corrected Notice of Allowability for U.S. Appl. No. 17/376,145, mailed Jan. 18, 2024.
Corrected Notice of Allowability for U.S. Appl. No. 17/376,145, mailed Jan. 4, 2024.
Corrected Notice of Allowability for U.S. Appl. No. 17/376,145, mailed Mar. 13, 2024.
Corrected Notice of Allowability for U.S. Appl. No. 17/376,145, mailed Oct. 12, 2023.
Corrected Notice of Allowability for U.S. Appl. No. 17/408,365, mailed Feb. 26, 2024.
Corrected Notice of Allowability for U.S. Appl. No. 17/408,365, mailed Jan. 31, 2024.
Corrected Notice of Allowability for U.S. Appl. No. 17/868,734, mailed Feb. 1, 2024.
Corrected Notice of Allowability for U.S. Appl. No. 17/868,734, mailed Feb. 26, 2024.
Corrected Notice of Allowability for U.S. Appl. No. 17/868,734, mailed Nov. 27, 2023.
Fang, Chin, "Using NVMe Gen3 PCIe SSD Cards in High-density Servers for High-performance Big Data Transfer Over Multiple Network Channels", SLAC National Accelerator Laboratory, Stanford University, Stanford, California, Feb. 7, 2015, 17 pages.
Final Office Action for U.S. Appl. No. 15/256,495, mailed Dec. 4, 2019.
Final Office Action for U.S. Appl. No. 15/256,495, mailed Oct. 19, 2018.
Final Office Action for U.S. Appl. No. 15/345,509, mailed Feb. 21, 2019.
Final Office Action for U.S. Appl. No. 15/411,962, mailed Dec. 20, 2018.
Final Office Action for U.S. Appl. No. 16/202,079, mailed Feb. 15, 2024.
Final Office Action for U.S. Appl. No. 16/211,923, mailed Aug. 19, 2019.
Final Office Action for U.S. Appl. No. 16/424,474, mailed May 1, 2020.
Final Office Action for U.S. Appl. No. 16/692,997, mailed Mar. 26, 2020.
Final Office Action for U.S. Appl. No. 16/844,995, mailed Mar. 29, 2021.
Final Office Action for U.S. Appl. No. 17/022,075, mailed May 25, 2022.
Final Office Action for U.S. Appl. No. 17/063,501, mailed Nov. 2, 2021.
Final Office Action for U.S. Appl. No. 17/063,507, mailed Jun. 27, 2022.
Final Office Action for U.S. Appl. No. 17/063,507, mailed Nov. 22, 2021.
Final Office Action for U.S. Appl. No. 17/230,989, mailed Jun. 28, 2023.
Final Office Action for U.S. Appl. No. 17/230,989, mailed Mar. 5, 2024.
Final Office Action for U.S. Appl. No. 17/230,989, mailed Sep. 26, 2023.
Final Office Action for U.S. Appl. No. 17/408,365, mailed Apr. 18, 2023.
Final Office Action for U.S. Appl. No. 17/408,365, mailed Dec. 27, 2022.
Final Office Action for U.S. Appl. No. 18/106,477, mailed Jul. 25, 2024.
Final Office Action for U.S. Appl. No. 18/113,618, mailed Aug. 14, 2024.
Notice of Allowance for U.S. Appl. No. 15/256,495, mailed Mar. 5, 2020.
Notice of Allowance for U.S. Appl. No. 15/345,507, mailed Feb. 19, 2019.
Notice of Allowance for U.S. Appl. No. 15/345,509, mailed Feb. 8, 2022.
Notice of Allowance for U.S. Appl. No. 15/345,509, mailed May 13, 2021.
Notice of Allowance for U.S. Appl. No. 15/403,088, mailed Oct. 22, 2018.
Notice of Allowance for U.S. Appl. No. 15/411,962, mailed Mar. 18, 2019.
Notice of Allowance for U.S. Appl. No. 16/202,079, mailed Jan. 27, 2021.
Notice of Allowance for U.S. Appl. No. 16/202,079, mailed Jun. 1, 2020.
Notice of Allowance for U.S. Appl. No. 16/202,079, mailed Mar. 17, 2022.
Notice of Allowance for U.S. Appl. No. 16/202,079, mailed May 14, 2021.
Notice of Allowance for U.S. Appl. No. 16/211,923, mailed Sep. 13, 2019.
Notice of Allowance for U.S. Appl. No. 16/421,458, mailed Apr. 15, 2020.
Notice of Allowance for U.S. Appl. No. 16/424,474, mailed Apr. 30, 2021.
Notice of Allowance for U.S. Appl. No. 16/424,474, mailed Jul. 15, 2020.
Notice of Allowance for U.S. Appl. No. 16/692,997, mailed Jun. 1, 2020.
Notice of Allowance for U.S. Appl. No. 16/844,995, mailed Aug. 26, 2022.
Notice of Allowance for U.S. Appl. No. 16/844,995, mailed Sep. 29, 2021.
Notice of Allowance for U.S. Appl. No. 16/857,172, mailed May 3, 2021.
Notice of Allowance for U.S. Appl. No. 16/921,923, mailed Feb. 18, 2021.
Notice of Allowance for U.S. Appl. No. 16/950,624, mailed May 10, 2021.
Notice of Allowance for U.S. Appl. No. 17/022,075, mailed Aug. 23, 2022.
Notice of Allowance for U.S. Appl. No. 17/022,075, mailed Nov. 29, 2023.
Notice of Allowance for U.S. Appl. No. 17/063,501, mailed Jun. 2, 2022.

(56) References Cited

OTHER PUBLICATIONS

Notice of Allowance for U.S. Appl. No. 17/063,507, mailed Oct. 7, 2022.
Notice of Allowance for U.S. Appl. No. 17/099,776, mailed Aug. 8, 2023.
Notice of Allowance for U.S. Appl. No. 17/099,776, mailed Feb. 15, 2022.
Notice of Allowance for U.S. Appl. No. 17/376,145, mailed Jun. 20, 2023.
Notice of Allowance for U.S. Appl. No. 17/408,365, mailed Sep. 19, 2023.
Notice of Allowance for U.S. Appl. No. 17/868,734, mailed Jul. 6, 2023.
NVM Express over Fabrics specification Revision 1.0; NVM Express Inc.; Jun. 5, 2016. (Year: 2016).
OC3D, "What is the New U.2 SSD Connection?" OC3D News, Jul. 2016, (https://www.overclock3d.net/news/storage/what_is_the_new_u_2_ssd_connection/1), retrieved May 2018, 4 pages.
OC3D, "What is the New U.2 SSD Connection?," (https://www.overclock3d.net/news/storage/what_is_the_new_u_2_ssd_connection/1), Jul. 2016, retrieved Apr. 12, 2021, 5 pages.
Office Action for U.S. Appl. No. 15/256,495, mailed Jun. 14, 2019.
Office Action for U.S. Appl. No. 15/256,495, mailed Mar. 29, 2018.
Office Action for U.S. Appl. No. 15/345,507, mailed Dec. 3, 2018.
Office Action for U.S. Appl. No. 15/345,509, mailed Apr. 29, 2020.
Office Action for U.S. Appl. No. 15/345,509, mailed Nov. 29, 2019.
Office Action for U.S. Appl. No. 15/345,509, mailed Sep. 10, 2018.
Office Action for U.S. Appl. No. 15/345,509, mailed Sep. 28, 2020.
Office Action for U.S. Appl. No. 15/403,088, mailed Jun. 7, 2018.
Office Action for U.S. Appl. No. 15/411,962, mailed Aug. 10, 2018.
Office Action for U.S. Appl. No. 16/202,079, mailed Aug. 22, 2019.
Office Action for U.S. Appl. No. 16/202,079, mailed Dec. 9, 2021.
Office Action for U.S. Appl. No. 16/202,079, mailed Feb. 2, 2023.
Office Action for U.S. Appl. No. 16/202,079, mailed Mar. 4, 2020.
Office Action for U.S. Appl. No. 16/211,923, mailed May 6, 2019.
Office Action for U.S. Appl. No. 16/421,458, mailed Dec. 30, 2019.
Office Action for U.S. Appl. No. 16/424,474, mailed Feb. 3, 2020.
Office Action for U.S. Appl. No. 16/424,474, mailed Oct. 15, 2019.
Office Action for U.S. Appl. No. 16/692,997, mailed Dec. 19, 2019.
Advisory Action for U.S. Appl. No. 15/256,495, mailed Feb. 1, 2019.
Corrected Notice of Allowability for U.S. Appl. No. 15/256,495, mailed Mar. 18, 2021.
Corrected Notice of Allowability for U.S. Appl. No. 15/256,495, mailed May 13, 2021.
Corrected Notice of Allowability for U.S. Appl. No. 15/345,509, mailed Aug. 11, 2021.
Corrected Notice of Allowability for U.S. Appl. No. 15/345,509, mailed Aug. 30, 2021.
Corrected Notice of Allowability for U.S. Appl. No. 15/345,509, mailed Aug. 8, 2022.
Corrected Notice of Allowability for U.S. Appl. No. 15/345,509, mailed Dec. 10, 2021.
Corrected Notice of Allowability for U.S. Appl. No. 15/345,509, mailed Jun. 10, 2022.
Corrected Notice of Allowability for U.S. Appl. No. 15/345,509, mailed Jun. 15, 2021.
Corrected Notice of Allowability for U.S. Appl. No. 15/345,509, mailed Jun. 27, 2022.
Corrected Notice of Allowability for U.S. Appl. No. 15/345,509, mailed Oct. 27, 2021.
Corrected Notice of Allowability for U.S. Appl. No. 15/345,509, mailed Sep. 7, 2022.
Corrected Notice of Allowability for U.S. Appl. No. 16/202,079, mailed Aug. 17, 2022.
Corrected Notice of Allowability for U.S. Appl. No. 16/202,079, mailed Aug. 31, 2022.
Corrected Notice of Allowability for U.S. Appl. No. 16/202,079, mailed Jul. 12, 2021.
Corrected Notice of Allowability for U.S. Appl. No. 16/202,079, mailed Jul. 22, 2020.
Corrected Notice of Allowability for U.S. Appl. No. 16/202,079, mailed Jul. 7, 2022.
Corrected Notice of Allowability for U.S. Appl. No. 16/202,079, mailed Sep. 15, 2021.
Corrected Notice of Allowability for U.S. Appl. No. 16/424,474, mailed Aug. 18, 2021.
Corrected Notice of Allowability for U.S. Appl. No. 16/424,474, mailed Feb. 22, 2021.
Corrected Notice of Allowability for U.S. Appl. No. 16/424,474, mailed Mar. 29, 2021.
Corrected Notice of Allowability for U.S. Appl. No. 16/692,997, mailed Jun. 18, 2020.
Corrected Notice of Allowability for U.S. Appl. No. 16/844,995, mailed Dec. 9, 2021.
Corrected Notice of Allowability for U.S. Appl. No. 16/844,995, mailed Feb. 12, 2024.
Corrected Notice of Allowability for U.S. Appl. No. 16/844,995, mailed Jan. 19, 2023.
Corrected Notice of Allowability for U.S. Appl. No. 16/844,995, mailed Jun. 30, 2023.
Corrected Notice of Allowability for U.S. Appl. No. 16/844,995, mailed Jun. 7, 2023.
Corrected Notice of Allowability for U.S. Appl. No. 16/844,995, mailed Mar. 15, 2023.
Corrected Notice of Allowability for U.S. Appl. No. 16/844,995, mailed Mar. 22, 2023.
Corrected Notice of Allowability for U.S. Appl. No. 16/844,995, mailed Mar. 6, 2024.
Corrected Notice of Allowability for U.S. Appl. No. 16/844,995, mailed May 5, 2023.
Corrected Notice of Allowability for U.S. Appl. No. 16/844,995, mailed Nov. 27, 2023.
Corrected Notice of Allowability for U.S. Appl. No. 16/844,995, mailed Oct. 12, 2023.
Corrected Notice of Allowability for U.S. Appl. No. 16/844,995, mailed Oct. 20, 2022.
Corrected Notice of Allowability for U.S. Appl. No. 16/844,995, mailed Sep. 5, 2023.
Corrected Notice of Allowability for U.S. Appl. No. 16/857,172, mailed Aug. 20, 2021.
Corrected Notice of Allowability for U.S. Appl. No. 16/921,923, mailed Apr. 1, 2021.
Corrected Notice of Allowability for U.S. Appl. No. 16/921,923, mailed Aug. 24, 2021.
Corrected Notice of Allowability for U.S. Appl. No. 16/921,923, mailed Jul. 14, 2021.
Corrected Notice of Allowability for U.S. Appl. No. 16/921,923, mailed May 26, 2021.
Corrected Notice of Allowability for U.S. Appl. No. 16/950,624, mailed Jul. 16, 2021.
Corrected Notice of Allowability for U.S. Appl. No. 16/950,624, mailed Jun. 10, 2021.
Corrected Notice of Allowability for U.S. Appl. No. 17/022,075, mailed Dec. 5, 2022.
Corrected Notice of Allowability for U.S. Appl. No. 17/022,075, mailed Jan. 2, 2024.
Corrected Notice of Allowability for U.S. Appl. No. 17/022,075, mailed Jan. 22, 2024.
Corrected Notice of Allowability for U.S. Appl. No. 17/022,075, mailed Mar. 15, 2024.
Corrected Notice of Allowability for U.S. Appl. No. 17/022,075, mailed Sep. 6, 2022.
Corrected Notice of Allowability for U.S. Appl. No. 17/063,501, mailed Aug. 24, 2022.
Corrected Notice of Allowability for U.S. Appl. No. 17/063,501, mailed Jul. 27, 2022.
Corrected Notice of Allowability for U.S. Appl. No. 17/063,501, mailed Jul. 7, 2022.
Final Office Action for U.S. Appl. No. 17/022,075, mailed Jul. 8, 2025.

(56) References Cited

OTHER PUBLICATIONS

Final Office Action for U.S. Appl. No. 17/022,075, mailed Jun. 4, 2025.
Final Office Action for U.S. Appl. No. 17/230,989, mailed Apr. 25, 2025.
Final Office Action for U.S. Appl. No. 18/074,445, mailed May 16, 2025.
Final Office Action for U.S. Appl. No. 18/113,618, mailed May 30, 2025.
Notice of Allowance for U.S. Appl. No. 18/106,477, mailed Jun. 3, 2025.
Notice of Allowance for U.S. Appl. No. 18/437,234, mailed May 7, 2025.
Office Action for U.S. Appl. No. 18/381,614, mailed Jun. 4, 2025.
Final Office Action for U.S. Appl. No. 18/074,445, mailed Feb. 13, 2025.
Office Action for U.S. Appl. No. 17/022,075, mailed Nov. 26, 2024.
Office Action for U.S. Appl. No. 18/106,477, mailed Nov. 8, 2024.
Office Action for U.S. Appl. No. 18/113,618, mailed Dec. 4, 2024.
Office Action for U.S. Appl. No. 18/437,234, mailed Jan. 6, 2025.
NVM Express, "Moves Into The Future," publisher nvmexpress.org, Jun. 2016, 7 pages.
Office Action for U.S. Appl. No. 17/230,989, mailed Aug. 29, 2024.
Notice of Allowance for U.S. Appl. No. 16/202,079, mailed Sep. 24, 2024.
Office Action for U.S. Appl. No. 18/437,234, mailed Sep. 12, 2024.
Office Action for U.S. Appl. No. 18/074,445, mailed Sep. 15, 2025.
Notice of Allowance for U.S. Appl. No. 15/256,495, mailed Oct. 15, 2025.
Notice of Allowance for U.S. Appl. No. 18/113,618, mailed Oct. 31, 2025.
Office Action for U.S. Appl. No. 17/022,075, mailed Oct. 28, 2025.
Office Action for U.S. Appl. No. 18/437,234, mailed Oct. 17, 2025.
Final Office Action for U.S. Appl. No. 18/381,614, mailed Nov. 18, 2025.
Office Action for U.S. Appl. No. 17/230,989, mailed Nov. 21, 2025.

* cited by examiner

SELF-CONFIGURING SSD MULTI-PROTOCOL SUPPORT IN HOST-LESS ENVIRONMENT

RELATED APPLICATION DATA

This application is a continuation of U.S. patent application Ser. No. 16/844,995, filed Apr. 9, 2020, now allowed, which is a continuation of U.S. patent application Ser. No. 15/256,495, filed Sep. 2, 2016, now allowed, which claims the benefit of U.S. Provisional Patent Application Ser. No. 62/366,622, filed Jul. 26, 2016, all of which are incorporated by reference herein for all purposes.

FIELD

The inventive concepts relate generally to Solid State Drives (SSDs), and more particularly to SSDs that may support multiple transport protocols and that may configure themselves in host machines.

BACKGROUND

Modern storage devices use many different interfaces, such as Serial AT Attachment (SATA), Serial Attached Small Computer System Interface (SCSI) (SAS), and Non-Volatile Memory Express (NVMe), among others, to connect to host machines. Host systems and operating systems are required to support these multi-protocol/device environments. For example, faster or higher performing devices may be assigned and used as cache or a higher tier by the OS/driver/VM/application. Slower devices may be used as a lower tier of storage etc.

From a hardware perspective, storage devices are designed and programmed to be a fixed specific device by the manufacturers. For example, manufacturers must decide upfront that the devices should be classified as SAS or SATA respectively before shipping out. Once manufactured and shipped, a customer might not make any protocol changes afterward.

Host operating systems and applications must be designed to handle a variety of mixed devices. This required robustness in terms of hardware support results in operating system and application complexity and expense. Conventionally, all storage devices are required to inform the host whether to use SATA, SAS, enterprise NVMe, or other transport protocols. The host operating systems is then required to perform bus enumeration and discover all of these devices. In a large system, this process takes several minutes to complete.

A need remains for a way for devices to configure themselves based on information about the chassis into which the devices are installed.

DETAILED DESCRIPTION

Figure 1:
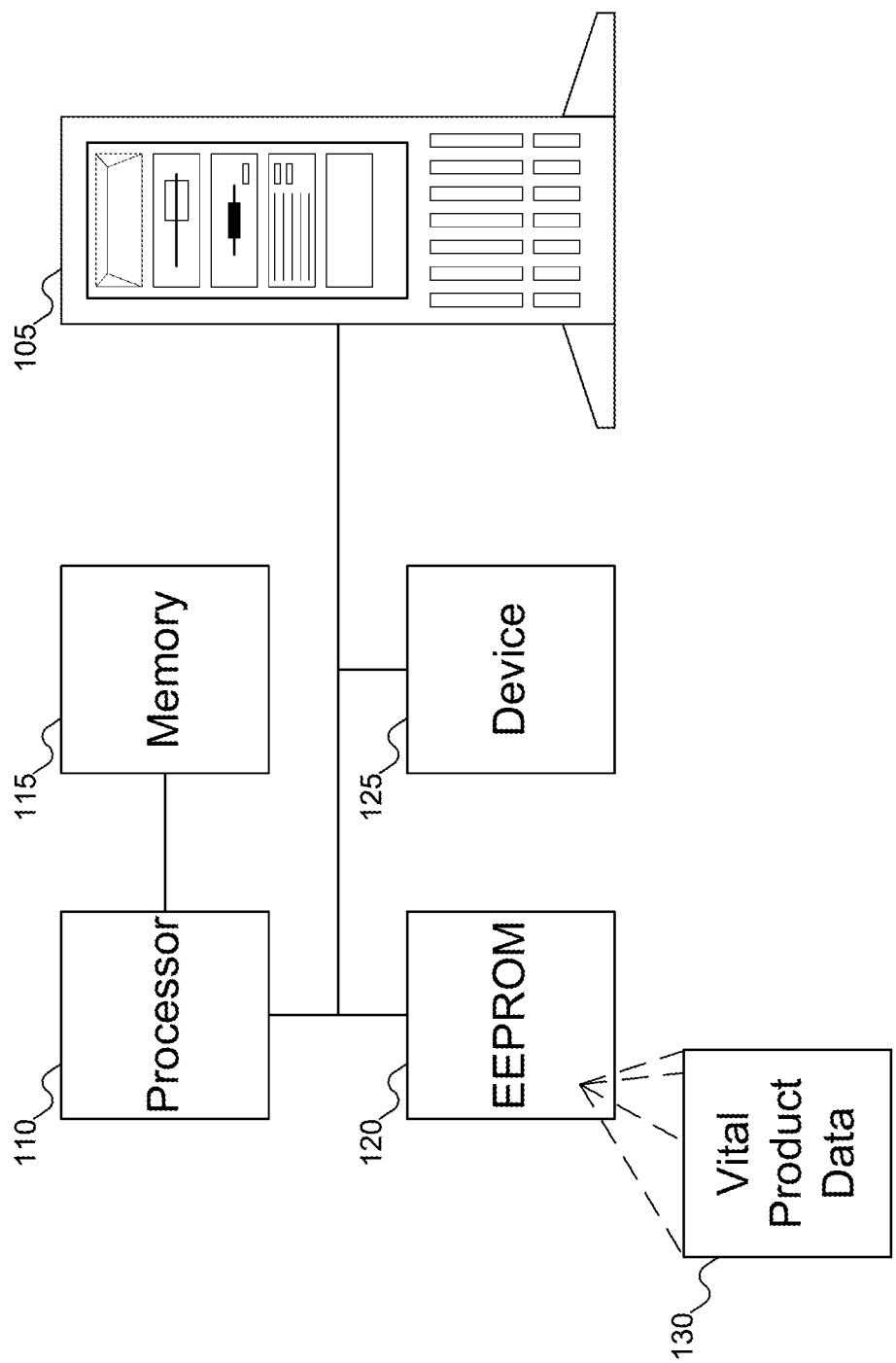
FIG. 1 shows a chassis with a self-configuring device installed therein, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Newer storage devices (or other devices, such as Network Interface Cards (NICs)) may use transport protocols such as Non-Volatile Memory Express (NVMe) over Fabrics (NVMeoF) to communicate with a chassis (also termed a host machine), and may support multiple transport protocols. When such devices are installed in a chassis, these devices may perform self-discovery during boot up and initialization. These devices may read Vital Product Data from a known location in an Electrically Erasable Programmable Read Only Memory (EEPROM). These devices may then discover that they are installed in an NVMeoF chassis. These devices may then configure themselves to enable, for example, the Ethernet ports and disabling other unnecessary/unused/unsupported transport protocol support. In this way the operating system and host CPU overhead related to multiple transport protocol discovery and management may be avoided. In a large storage system, using such self-configuring devices will shorten the enumeration process significantly because all devices may perform self-discovery independently by reading from a known location from the system. Host CPUs and operating systems are not required to be present.

FIG. 1 shows a chassis with a self-configuring device installed therein, according to an embodiment of the inventive concept. In FIG. 1, chassis 105 is shown. Chassis 105 may also be referred to as a host machine, or host for short. Chassis 105 may include various components, such as processor 110, memory 115, Electronically Erasable Programmable Read Only Memory (EEPROM) 120, and device 125. Processor 110 may be any variety of processor: for example, an Intel Xeon, Celeron, Itanium, or Atom processor, an AMD Opteron processor, an ARM processor, etc. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically DRAM.

EEPROM 120 may store Vital Product Data (VPD) 130. Vital Product Data 130 may be data used by device 125 to configure itself. For example, Vital Product Data 130 may store information about chassis 105 or about the transport protocol intended to be used to communicate with device 125. Example transport protocols that may be used to communicate with device 125 may include Ethernet, Fibre Channel, InfiniBand, or Non-Volatile Memory Express (NVMe), to name a few. Vital Product Data 130 may also store information about transport sub-protocols used. For example, if Vital Product Data 130 specifies that the Ethernet transport protocol is to be used, Vital Product Data 130 may store whether to use Remote Direct Memory Access (RDMA) over Converged Ethernet (RoCE) or iWarp, among other possibilities.

While FIG. 1 shows Vital Product Data 130 as being stored within EEPROM 120, embodiments of the inventive concept may support using any alternative storage mediums. For example, EEPROM 120 may be replaced with an Erasable Programmable Read Only Memory (EPROM) or flash memory, to name a few alternatives.

Device 125 may be any variety of device that may be self-configured. Examples of such devices may include storage devices and Network Interface Cards (NICs). Within the category of storage devices, Solid State Drives (SSDs) are one possibility for storage device, but other storage forms, such as hard disk drives or other long-term storage devices, are also viable.

Another type of device that may benefit from self-configuration is an intelligent device, such as an Ethernet or other variety of Solid State Drive (SSD) with an embedded processor running an embedded operating system. When chassis 105 boots up, the intelligent device may start before the embedded operating system begins. The intelligent device may then perform self-configuration. When the embedded operating system begins running, the intelligent device may perform software configuration as well, as needed.

In the remainder of this document, references to storage devices are intended to encompass other types of devices that may benefit from self-configuration, with changes to the internal components of the device as appropriate to the function of the device.

Figure 2:
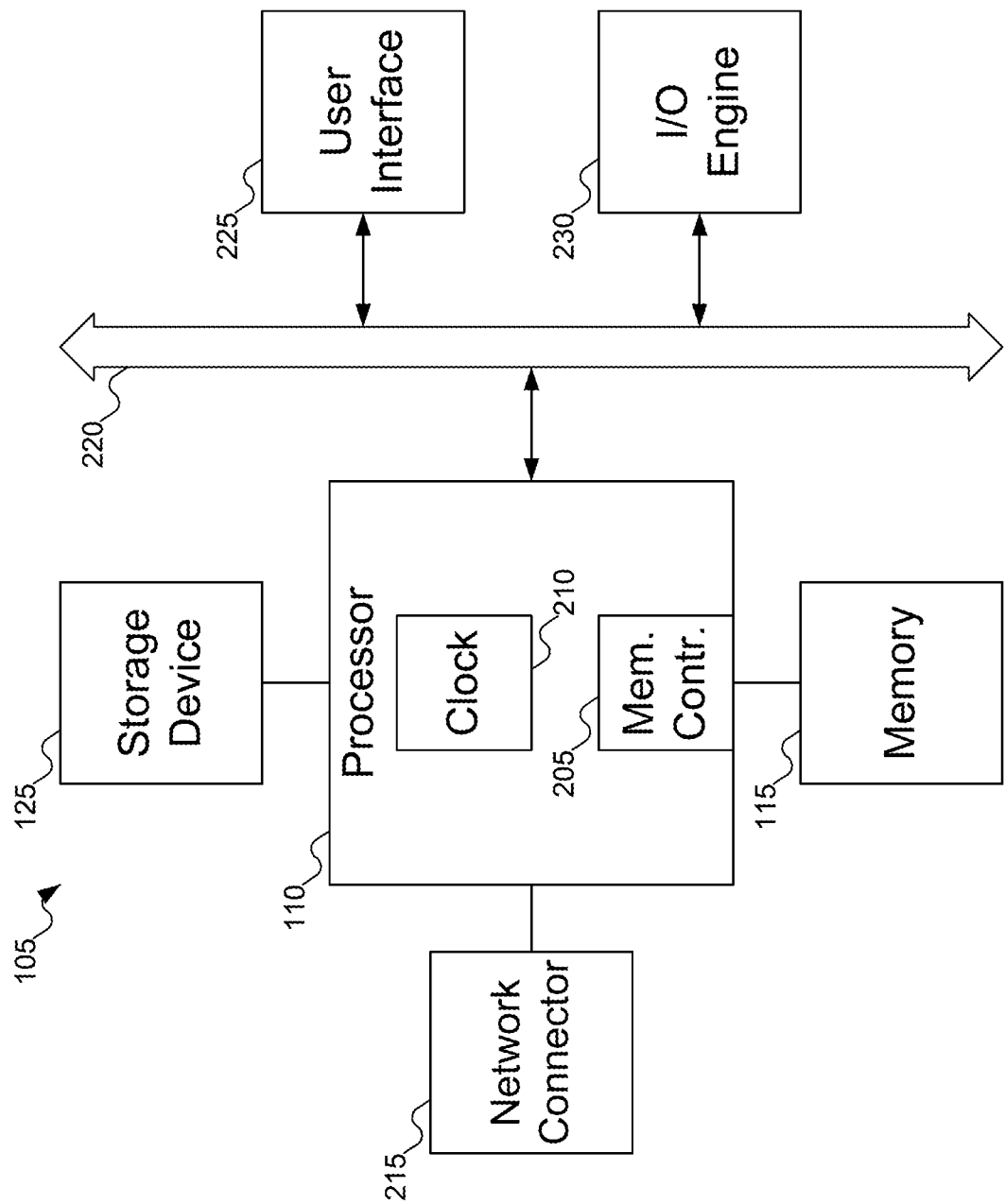
FIG. 2 shows additional details of the chassis of FIG. 1.

FIG. 2 shows additional details of chassis 105 of FIG. 1. Referring to FIG. 2, typically, chassis 105 include one or more processors 110, which may include memory controller 205 and clock 210, which may be used to coordinate the operations of the components of chassis 105. Processors 110 may also be coupled to memory 115, which may include random access memory (RAM), read-only memory (ROM), or other state preserving media, as examples. Processors 110 may also be coupled to storage devices 125, and to network connector 215, which may be, for example, an Ethernet connector or a wireless connector. Processors 110 may also be connected to a bus 220, to which may be attached user interface 225 and input/output interface ports that may be managed using input/output engine 230, among other components.

Figure 3:
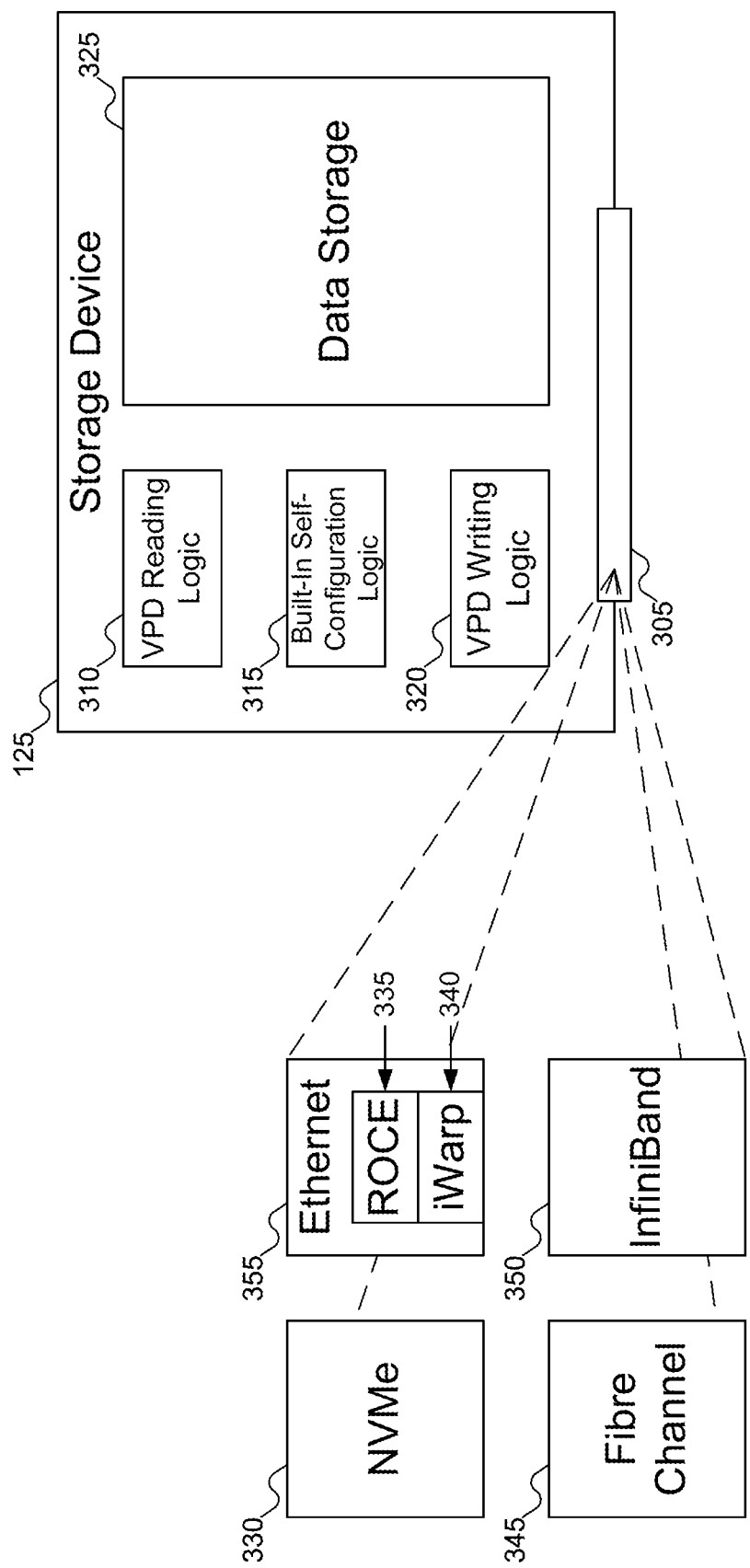
FIG. 3 shows details of the storage device of FIG. 1.

FIG. 3 shows details of storage device 125 of FIG. 1. In FIG. 3, storage device 125 may include interface 305, VPD reading logic 310, built-in self-configuration logic 315, VPD writing logic 320, and data storage 325. Interface 305 may represent both a physical connection to chassis 105 of FIG. 1 and the transport protocol(s) used in communications between storage device 125 and chassis 105 of FIG. 1, or communications with devices outside of the chassis 105 (i.e., other computers over a network). VPD reading logic 310 may read Vital Product Data 130 of FIG. 1 from EEPROM 120 of FIG. 1 via any bus, such as System Management Bus (SMBus) or Inter-Integrated Circuit (I2C or I$^2$C) bus. Built-in self-configuration logic 315 may configure interface 305 by enabling the transport protocol(s) supported by chassis 105 of FIG. 1 and disabling any transport protocols supported by storage device 125 but not supported by chassis 105 of FIG. 1. VPD writing logic 320 may write information to Vital Product Data 130 of FIG. 1 via a bus, similar to VPD reading logic 310. Data storage 325, of course, may store user data.

FIG. 3 also shows some example transport protocols that may be represented by interface 305. For example, transport protocols NVMe 330, RoCE 335, iWarp 340, Fibre Channel 345, and InfiniBand 350 may be transport protocols supported by storage device 125.

While the above describes RoCE 335 and iWarp 340 as transport protocols, RoCE 335 and iWarp 335 may be considered variations of Ethernet transport protocol 355. In some embodiments of the inventive concept, Ethernet 355 may be considered a transport protocol, with RoCE 335 and iWarp 340 as transport sub-protocols. In addition, while FIG. 3 does not show transport sub-protocols for other transport protocols, such as NVMe 330, Fibre Channel 345, or InfiniBand 350, embodiments of the inventive concept may support sub-channels for these other transport protocols as well.

Figure 4:
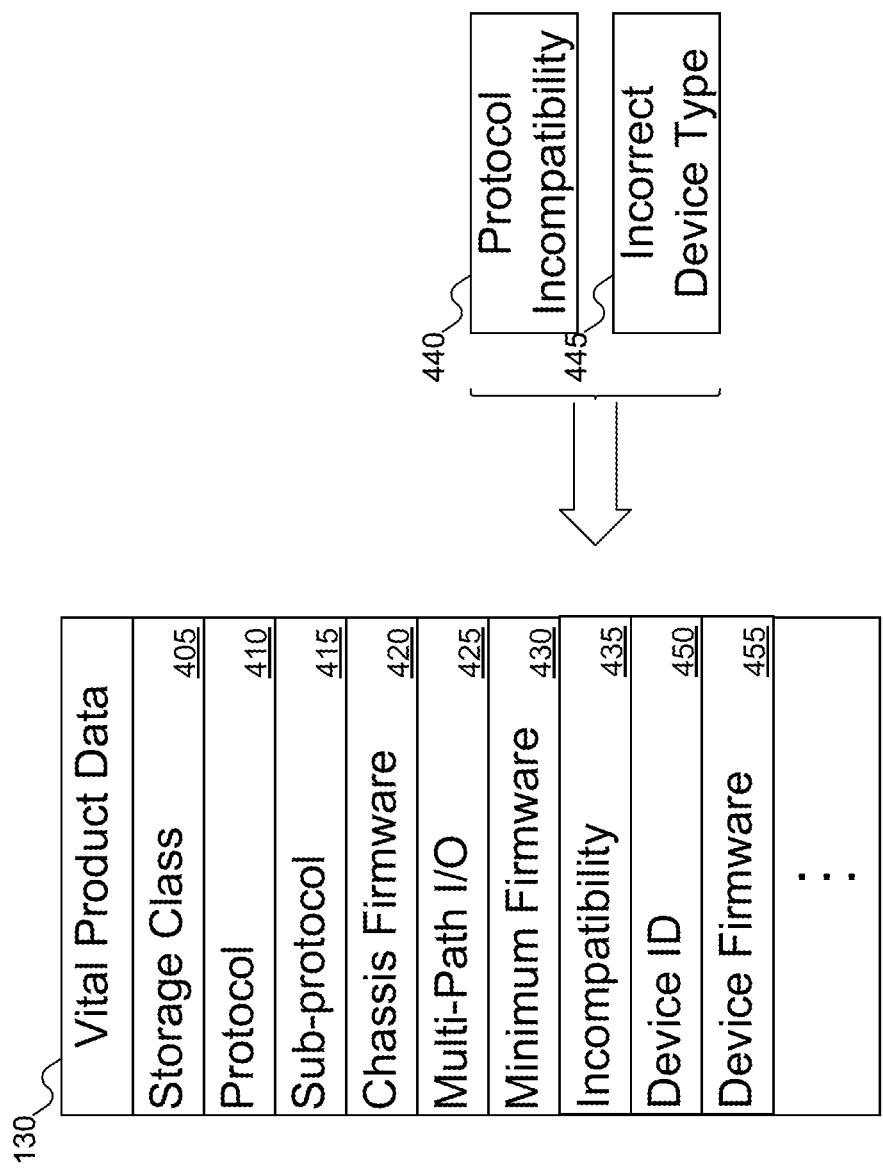
FIG. 4 shows various information being written to the Vital Product Data (VPD) of FIG. 1.

FIG. 4 shows various information being written to Vital Product Data 130 of FIG. 1. In FIG. 4, Vital Product Data 130 may include a data structure designed to store information pertinent to chassis 105 of FIG. 1. This information stored in Vital Product Data 130 may include:

Storage class 405, identifying a type of storage device 125 of FIG. 3 supported by the chassis such as NVMe, NVMeoF, Internet Small Computer System Interface (iSCSI), Fibre Channel, SAS, SATA, etc.

Transport protocol 410, identifying the transport protocol(s) supported by chassis 105 of FIG. 1.

Transport sub-protocol 415, identifying a transport sub-protocol supported by chassis 105 of FIG. 1.

Chassis firmware 420, identifying the firmware revision in use by chassis 105 of FIG. 1.

Multi-path Input/Output (I/O) 425, which, if enabled, identifies chassis 105 of FIG. 1 as a high availability system. Any single ported storage device installed in such a chassis should disable itself in favor of multi-port storage device.

Minimum firmware revision 430, specifying a minimum firmware revision for device 125 of FIG. 1. If the firmware revision of device 125 of FIG. 1 is below the specified threshold, then device 125 of FIG. 1 should report that it needs a firmware update by writing to a report status region of Vital Product Data 130.

Vital Product Data 130 may also include storage for information written by storage device 125 of FIG. 3. This information that may be written to Vital Product Data 130 may include:

Incompatibility 435, explaining why storage device 125 of FIG. 3 might not operate within chassis 105 of FIG. 1. One reason why storage device 125 of FIG. 3 might be incompatible with chassis 105 of FIG. 1 would be protocol incompatibility 440, such as when storage device 125 of FIG. 3 might not support Ethernet transport protocol but is installed in a chassis that uses Ethernet transport protocol for communication. Another example of protocol incompatibility 440 would be when chassis 105 of FIG. 1 needs a particular transport sub-protocol that storage device 125 of FIG. 3 does not support: for example, a RoCE device installed in an iWarp chassis. Another reason why storage device 125 of FIG. 3 might be incompatible with chassis 105 of FIG. 1 would be when storage device 125 of FIG. 3 is incorrect type 445, such as when chassis 105 of FIG. 1 needs a High Availability device, but storage device 125 of FIG. 3 is not a High Availability device, or chassis 105 of FIG. 1 needs a dual port device and storage device 125 of FIG. 1 is only a single port device.

Device ID 450, identifying the device installed in chassis 105 of FIG. 1.

Device firmware 455, identifying the current firmware revision of storage device 125 of FIG. 3.

Figure 5:
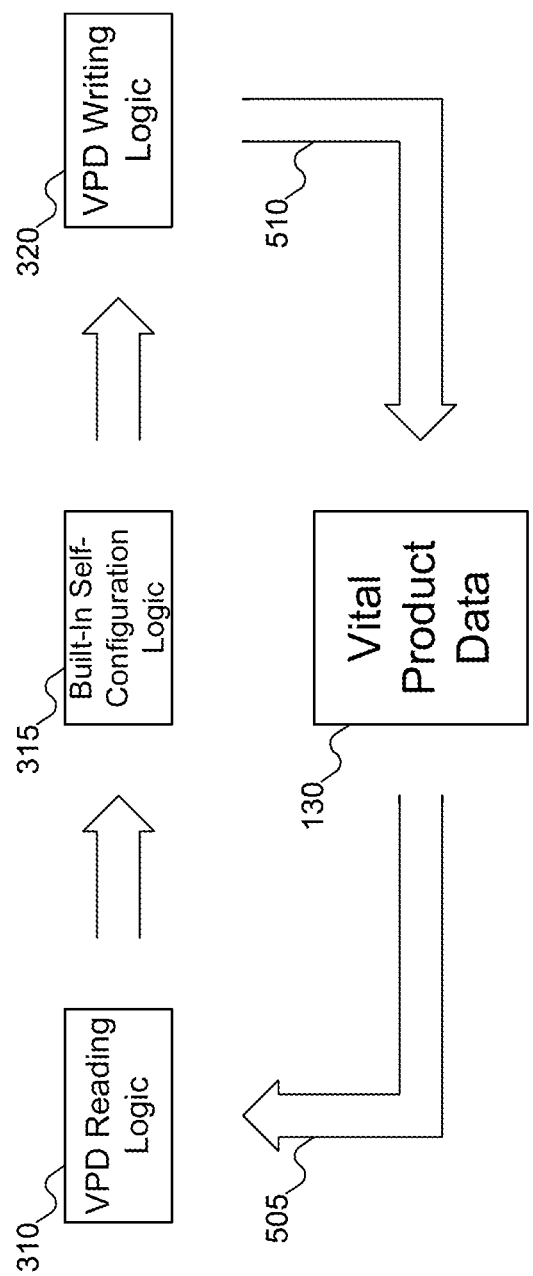
FIG. 5 shows the built-in self-configuration logic using the VPD reading logic and VPD writing logic of FIG. 3 to interact with the Vital Product Data of FIG. 1.

FIG. 5 shows built-in self-configuration logic 315 using VPD reading logic 310 and VPD writing logic 320 of FIG. 3 to interact with Vital Product Data 130 of FIG. 1. In FIG. 5, VPD reading logic 310 may read data from Vital Product Data 130, as shown by arrow 505. Additionally, VPD writing logic 320 may write information to Vital Product Data 130, as shown by arrow 510. Examples of information that may be written by VPD writing logic 320 to Vital Product Data 130 may include device ID 450 of FIG. 4, device firmware revision 455 of FIG. 4, and incompatibility information 435 of FIG. 4.

Figure 6:
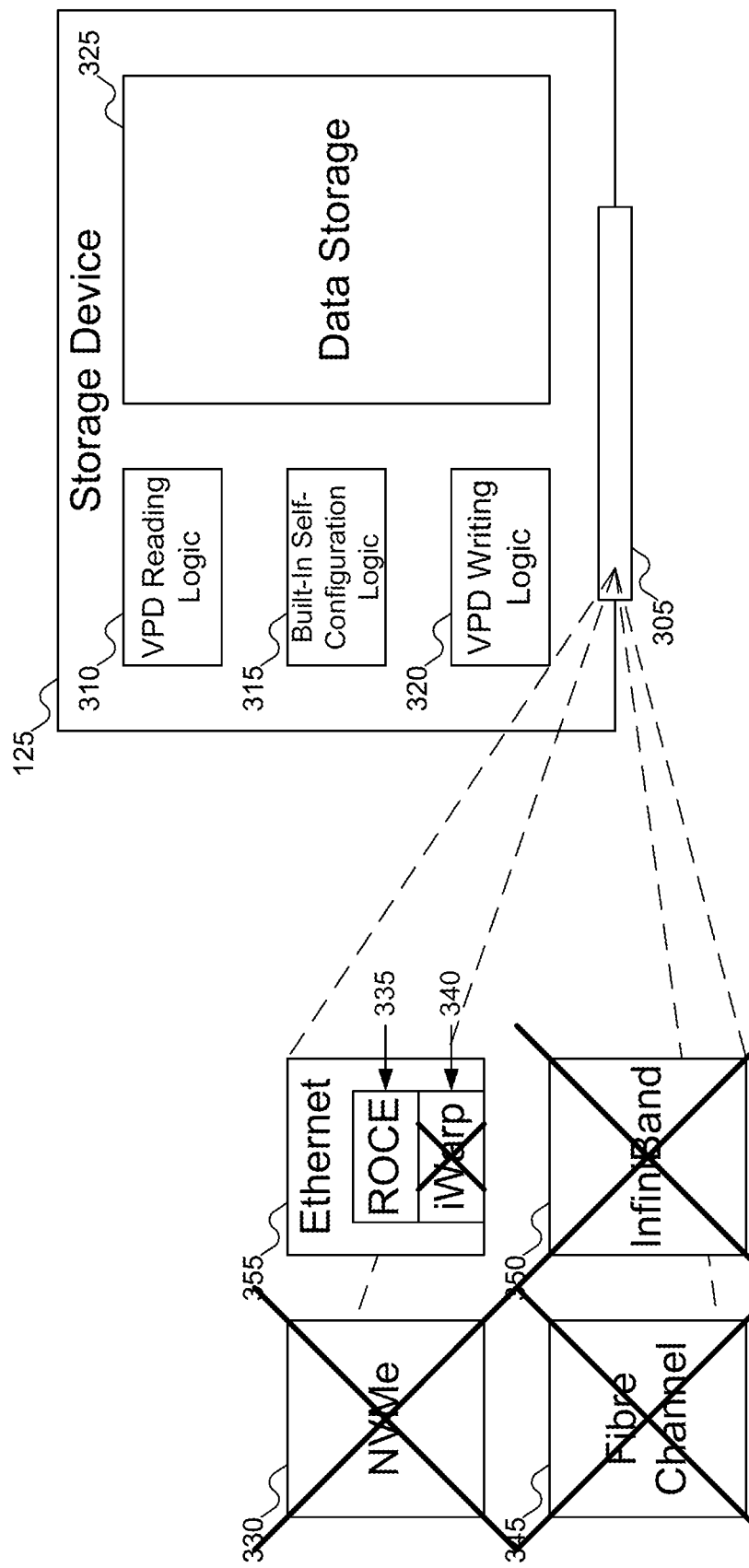
FIG. 6 shows the storage device of FIG. 3 after self-configuration.

FIG. 6 shows storage device 125 of FIG. 3 after self-configuration. In FIG. 6, storage device 125 has accessed Vital Product Data 130 of FIG. 1, which has indicated that chassis 105 of FIG. 1 uses the Ethernet transport protocol, with the RoCE transport sub-protocol. As a result, storage device 125 has disabled NVMe transport protocol 330, Fibre Channel transport protocol 345, InfiniBand transport protocol 350, and Ethernet iWarp transport protocol 340 (or sub-protocol, depending on the embodiment of the inventive concept), as shown by the large X symbols. Only Ethernet RoCE transport protocol 335 (or sub-protocol) is enabled.

Figure 7A:
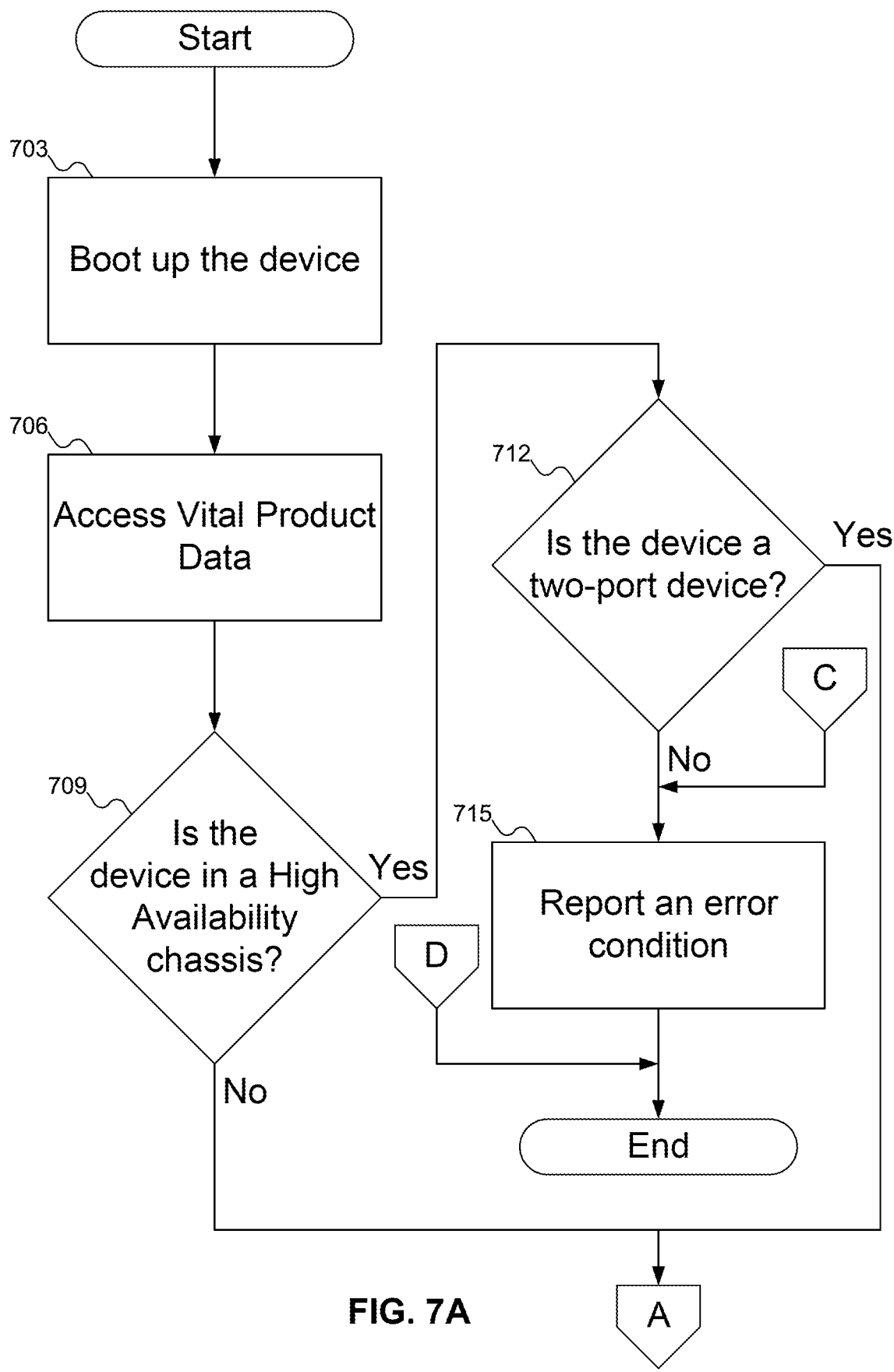
FIGS. 7A-7F show a flowchart of an example procedure for the device of FIG. 1 to self-configure to a number of different transport protocols, according to an embodiment of the inventive concept.
Figure 7B:
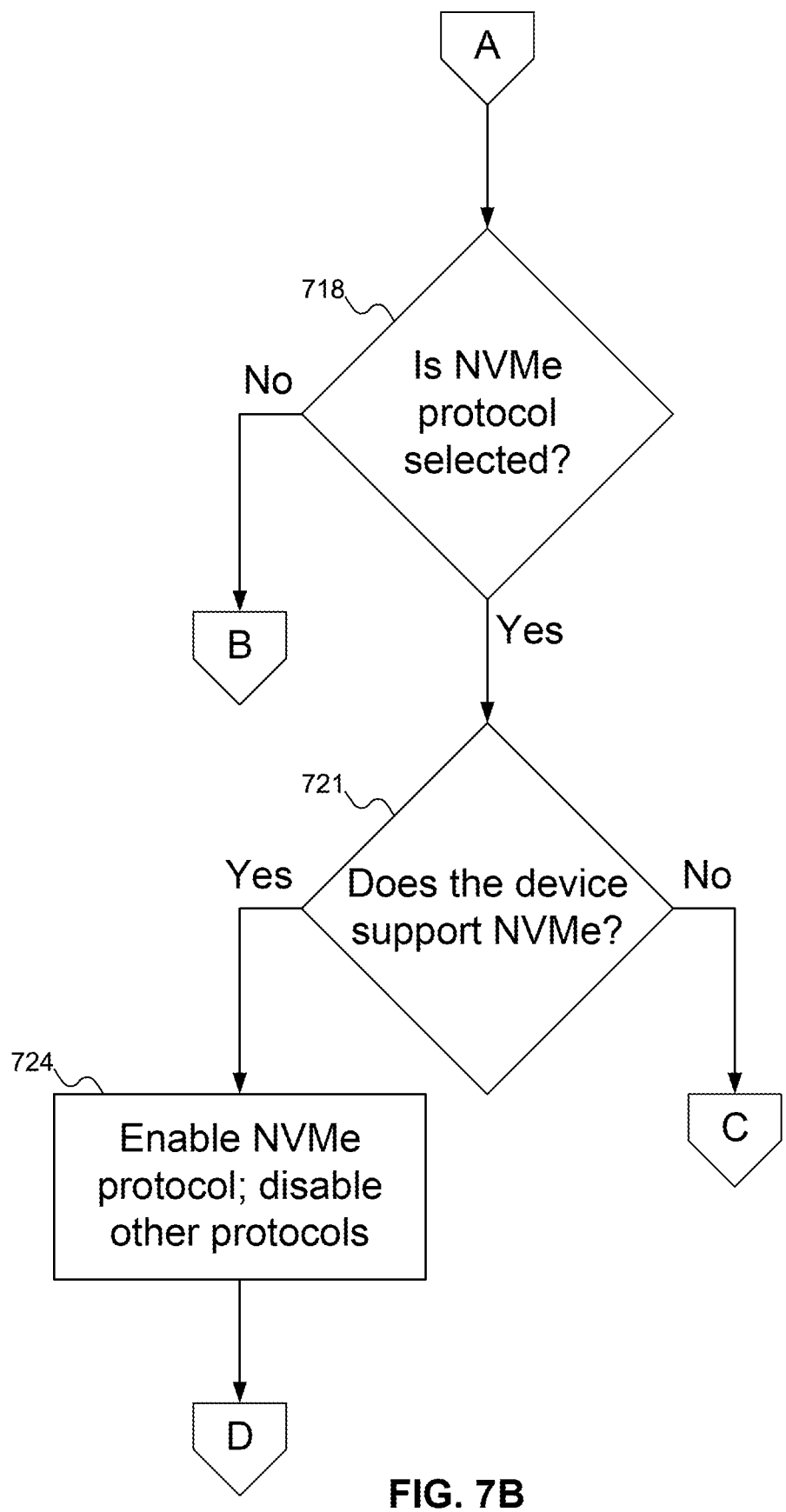
Figure 7C:
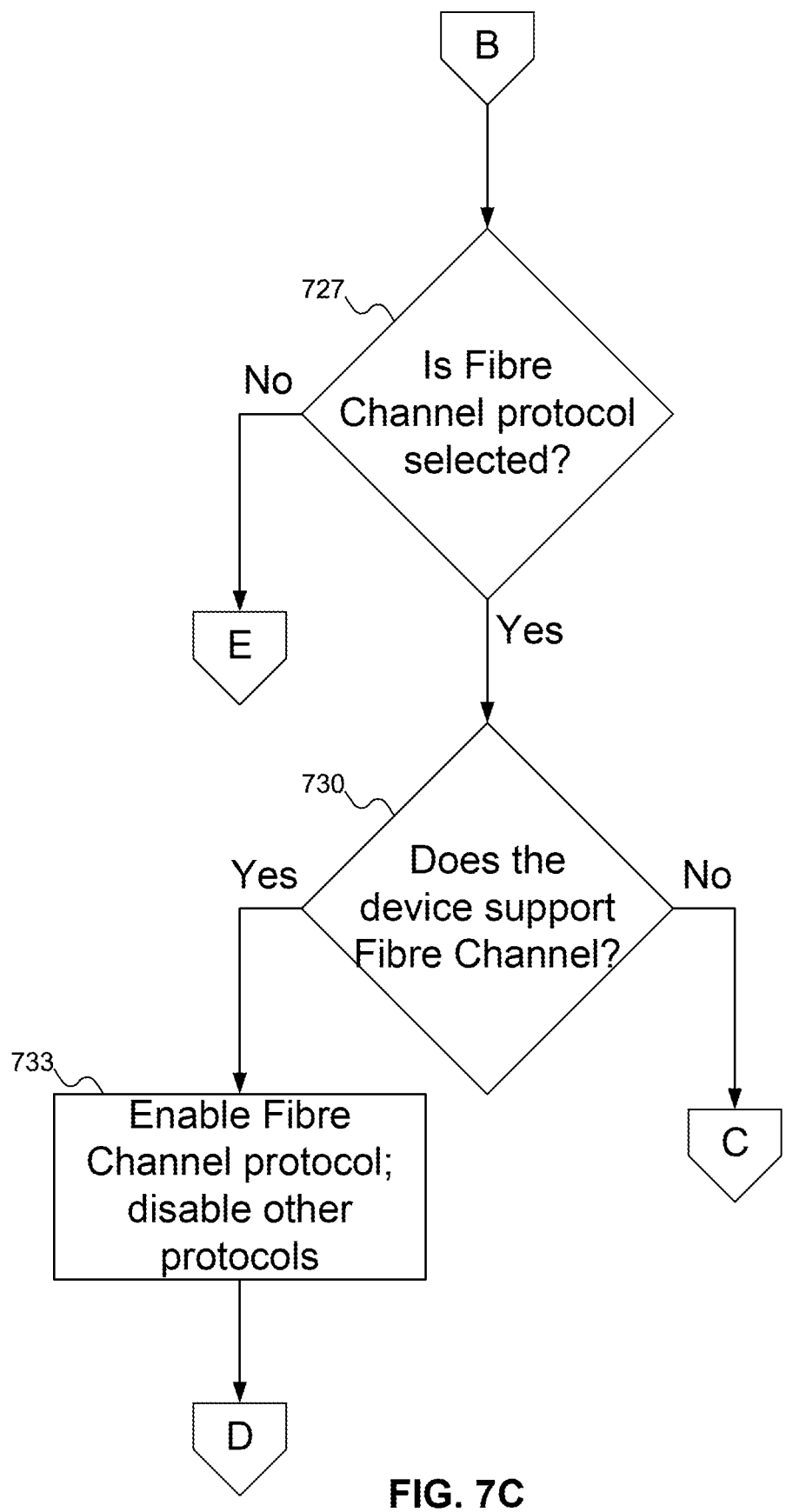
Figure 7D:
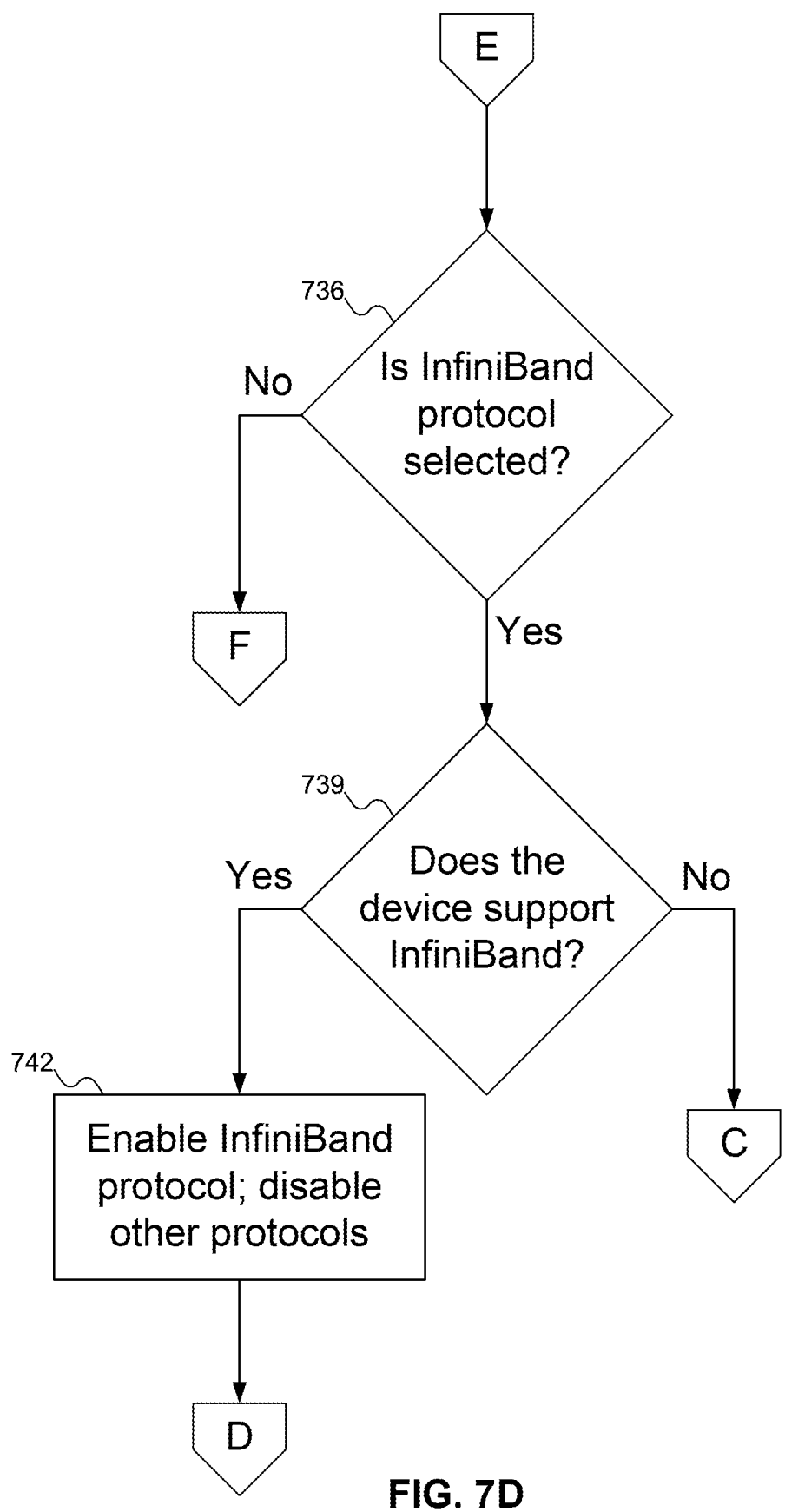
Figure 7E:
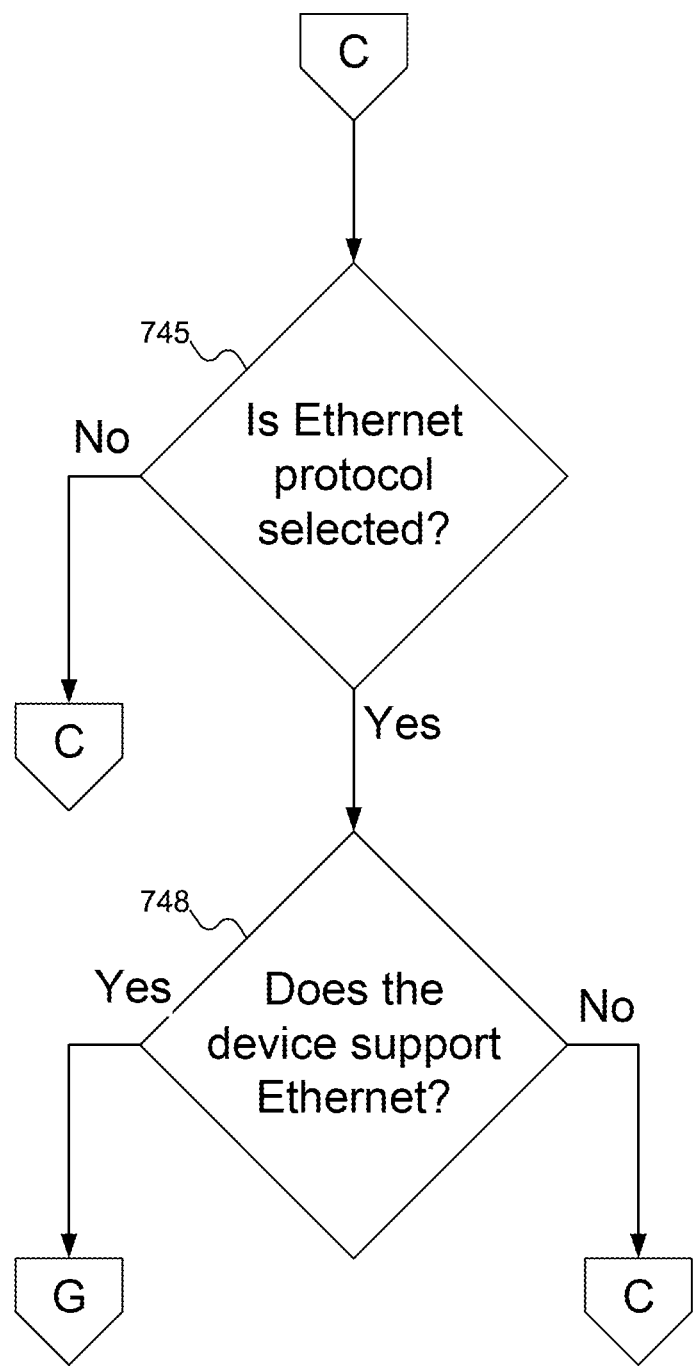
Figure 7F:
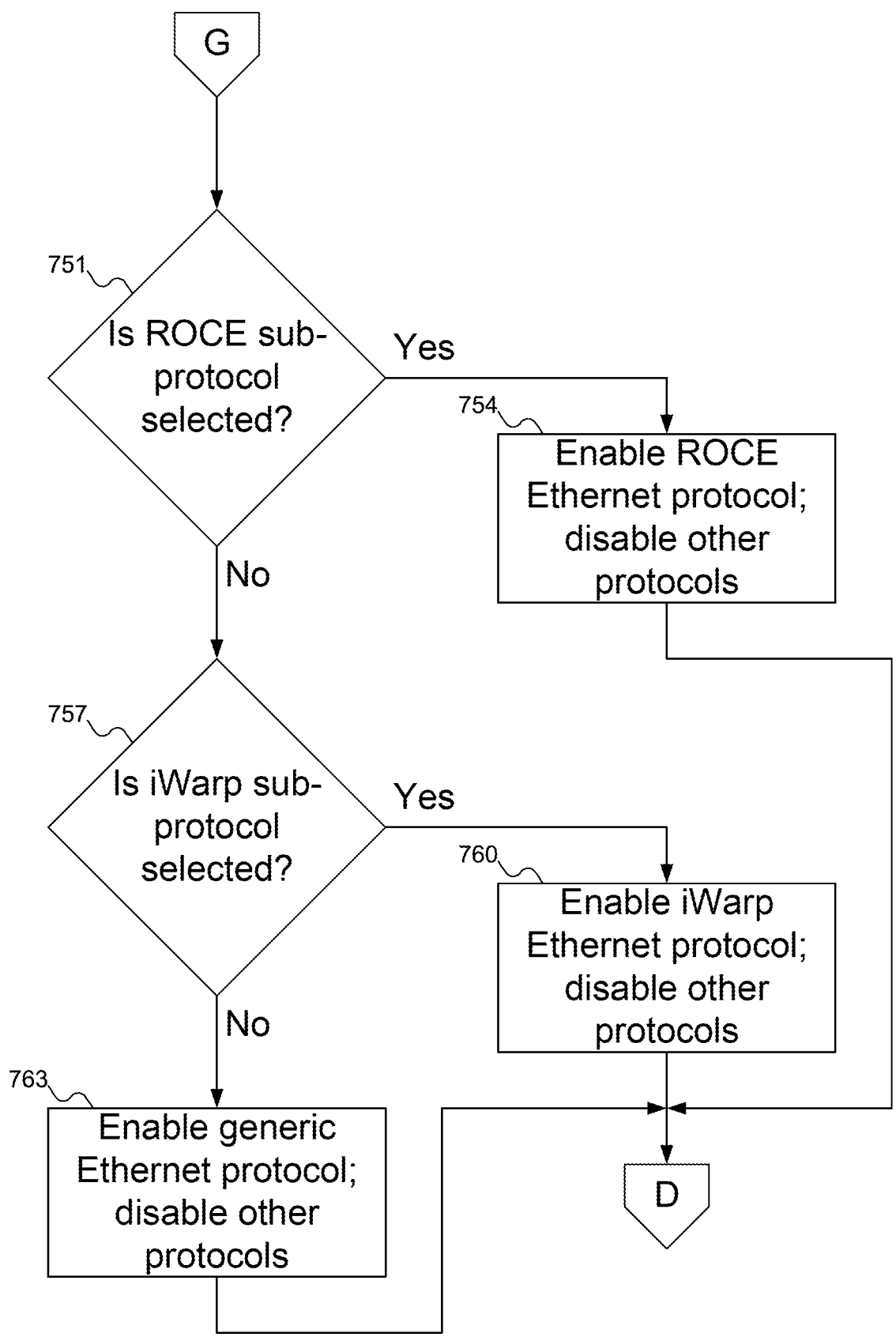

FIGS. 7A-7F show a flowchart of an example procedure for device 125 of FIG. 1 to self-configure to a number of different transport protocols, according to an embodiment of the inventive concept. In FIG. 7A, at block 703, device 125 of FIG. 1 may boot up. At block 706, built-in self-configuration logic 315 of FIG. 3 may use VPD reading logic 310 of FIG. 3 to access Vital Product Data 130 of FIG. 1 from EEPROM 120 of FIG. 1.

Starting with block 709, device 125 of FIG. 1 may determine whether it may be self-configured to chassis 105 of FIG. 1, and how to do so. At block 709, device 125 of FIG. 1 may determine from Vital Product Data 130 of FIG. 1 whether chassis 105 of FIG. 1 requires a High Availability device. If so, then at block 712, device 125 of FIG. 1 may determine whether it is a two-port device, as might be required for a High Availability device. If device 125 of FIG. 1 is not a two-port device, then at block 715 built-in self-configuration logic 315 of FIG. 3 may report an error condition: perhaps by using VPD writing logic 320 of FIG. 3 to write incompatibility information 445 of FIG. 4 to Vital Product Data 130 of FIG. 1.

Otherwise, chassis 105 of FIG. 1 does not require a High Availability device, or device 125 of FIG. 1 is a High Availability device. Either way, at block 718 (FIG. 7B), device 125 of FIG. 1 may determine whether chassis 105 of FIG. 1 expects to use NVMe transport protocol 330 of FIG. 3. If chassis 105 of FIG. 1 expects to use NVMe transport protocol 330 of FIG. 3, then at block 721 device 125 of FIG. 1 may determine if it supports NVMe transport protocol 330 of FIG. 3. If device 125 of FIG. 1 supports NVMe transport protocol 330 of FIG. 3, then at block 724 device 125 of FIG. 1 may self-configure to enable NVMe transport protocol 330 and to disable other transport protocols. Otherwise, control returns to block 715 for built-in self-configuration logic 315 of FIG. 3 to report an error condition, perhaps by using VPD writing logic 320 of FIG. 3 to write incompatibility information 440 to Vital Product Data 130 of FIG. 1.

If at block 718 chassis 105 of FIG. 1 did not expect to use NVMe transport protocol 330 of FIG. 3 for communications, then at block 727 (FIG. 7C), device 125 of FIG. 1 may determine whether chassis 105 of FIG. 1 expects to use Fibre Channel transport protocol 345 of FIG. 3. If chassis 105 of FIG. 1 expects to use Fibre Channel transport protocol 345 of FIG. 3, then at block 730 device 125 of FIG. 1 may determine if it supports Fibre Channel transport protocol 345 of FIG. 3. If device 125 of FIG. 1 supports Fibre Channel transport protocol 345 of FIG. 3, then at block 733 device 125 of FIG. 1 may self-configure to enable Fibre Channel transport protocol 345 and to disable other transport protocols. Otherwise, control returns to block 715 for built-in self-configuration logic 315 of FIG. 3 to report an error condition, perhaps by using VPD writing logic 320 of FIG. 3 to write incompatibility information 440 to Vital Product Data 130 of FIG. 1.

If at block 727 chassis 105 of FIG. 1 did not expect to use Fibre Channel transport protocol 345 of FIG. 3 for communications, then at block 736 (FIG. 7D), device 125 of FIG. 1 may determine whether chassis 105 of FIG. 1 expects to use InfiniBand transport protocol 350 of FIG. 3. If chassis 105 of FIG. 1 expects to use InfiniBand transport protocol 350 of FIG. 3, then at block 739 device 125 of FIG. 1 may determine if it supports InfiniBand transport protocol 350 of FIG. 3. If device 125 of FIG. 1 supports InfiniBand transport protocol 350 of FIG. 3, then at block 742 device 125 of FIG. 1 may self-configure to enable InfiniBand transport protocol 350 and to disable other transport protocols. Otherwise, control returns to block 715 for built-in self-configuration logic 315 of FIG. 3 to report an error condition, perhaps by using VPD writing logic 320 of FIG. 3 to write incompatibility information 440 to Vital Product Data 130 of FIG. 1.

If at block 736 chassis 105 of FIG. 1 did not expect to use InfiniBand transport protocol 350 of FIG. 3 for communications, then at block 745 (FIG. 7E), device 125 of FIG. 1 may determine whether chassis 105 of FIG. 1 expects to use Ethernet transport protocol 355 of FIG. 3. If chassis 105 of FIG. 1 expects to use Ethernet transport protocol 355 of FIG. 3, then at block 748 device 125 of FIG. 1 may determine if it supports Ethernet transport protocol 355 of FIG. 3. If device 125 of FIG. 1 does not support Ethernet transport protocol 355 of FIG. 3, then control returns to block 715 for built-in self-configuration logic 315 of FIG. 3 to report an error condition, perhaps by using VPD writing logic 320 of FIG. 3 to write incompatibility information 440 to Vital Product Data 130 of FIG. 1.

If at block 748 device 125 of FIG. 1 does support Ethernet transport protocol 355 of FIG. 3, then at block 751 (FIG. 7F), built-in self-configuration logic 315 of FIG. 3 may use VPD reading logic 310 of FIG. 3 to determine if Vital Product Data 130 of FIG. 1 specifies RoCE transport protocol 335 of FIG. 3 as a selected transport sub-protocol. If so, then at block 754, device 125 of FIG. 10 may self-configure to enable RoCE transport sub-protocol 335 and to disable other transport protocols/sub-protocols. Otherwise, at block 757, built-in self-configuration logic 315 of FIG. 3 may use VPD reading logic 310 of FIG. 3 to determine if Vital Product Data 130 of FIG. 1 specifies iWarp transport protocol 340 of FIG. 3 as a selected transport sub-protocol. If so, then at block 760, device 125 of FIG. 10 may self-configure to enable iWarp transport sub-protocol 340 and to disable other transport protocols/sub-protocols. Otherwise, at block 763, device 125 may self-configure to enable generic Ethernet transport protocol 355 of FIG. 3 and to disable other transport protocols. Processing may then end.

While FIGS. 7A-7F show built-in self-configuration logic 315 considered both transport protocols and sub-protocols, other embodiments of the inventive concept may consider only protocols. For example, instead of FIGS. 7E-7F, other embodiments of the inventive concept may include sheets similar to FIGS. 7B-7D, specifically considering RoCE protocol 335 of FIG. 3 and iWarp protocol 340 of FIG. 3.

In addition, FIGS. 7A-7F, some embodiments of the inventive concept are shown. For example, FIGS. 7A-7F show device 125 of FIG. 1 considering four transport protocols—NVMe transport protocol 330, Ethernet transport protocol 355, Fibre Channel transport protocol 345, and InfiniBand transport protocol 350, all of FIG. 3—and two transport sub-protocols—Ethernet RoCE transport sub-protocol 335 and Ethernet iWarp transport sub-protocol 340, both of FIG. 3. But embodiments of the inventive concept may be extended to support any number of transport protocols, each of which may include any number of transport sub-protocols (including zero). In addition, device 125 of FIG. 1 may consider the transport protocols in any desired order, not only that shown in FIGS. 7A-7F. All such variations are considered to be within the scope of the inventive concept.

Figure 8:
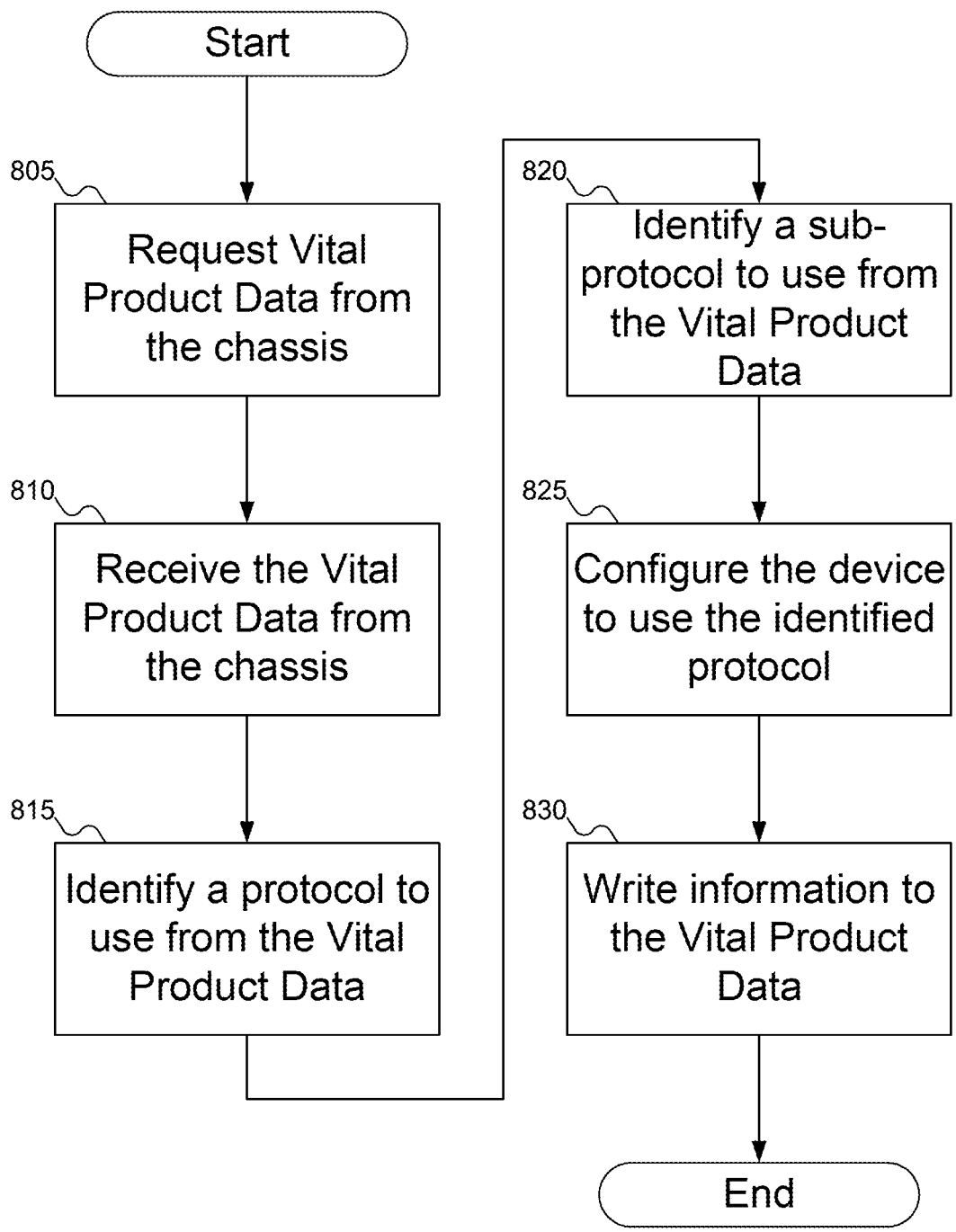
FIG. 8 shows a flowchart of an example procedure for the device of FIG. 1 to self-configure.

FIG. 8 shows a flowchart of an example procedure for device 125 of FIG. 1 to self-configure, according to an embodiment of the inventive concept. FIG. 8 is a more generalized version of FIGS. 7A-7F. In FIG. 8, at block 805, built-in self-configuration logic 315 of FIG. 3 may, using VPD reading logic 310 of FIG. 3, request access to Vital Product Data 130 of FIG. 1, stored in EEPROM 120 of FIG. 1. At block 810, device 125 of FIG. 1 may receive Vital Product Data 130 of FIG. 1. At block 815, device 125 of FIG. 1 may identify a transport protocol to use from Vital Product Data 130 of FIG. 1. At block 820, device 125 of FIG. 1 may identify a transport sub-protocol to use from Vital Product Data 130 of FIG. 1. At block 825, device 125 may self-configure to use the identified transport protocol/sub-protocol, by enabling and disabling transport protocols/sub-protocols as appropriate. Finally, at block 830, built-in self-configuration logic 315 of FIG. 3 may, using VPD writing logic 320 of FIG. 3, write information to Vital Product Data 130 of FIG. 1. As described above, such information may include, for example, an incompatibility of type or transport protocol between chassis 105 of FIG. 1 and device 125 of FIG. 1.

As discussed above with reference to FIG. 3, instead of considering RoCE 335 and iWarp 340, both of FIG. 3, as sub-protocols of Ethernet protocol 355 of FIG. 3, RoCE 335 and iWarp 340, both of FIG. 3, may be considered to be their own protocols. To support such embodiments of the inventive concept, block 820 may be omitted.

Figure 9:
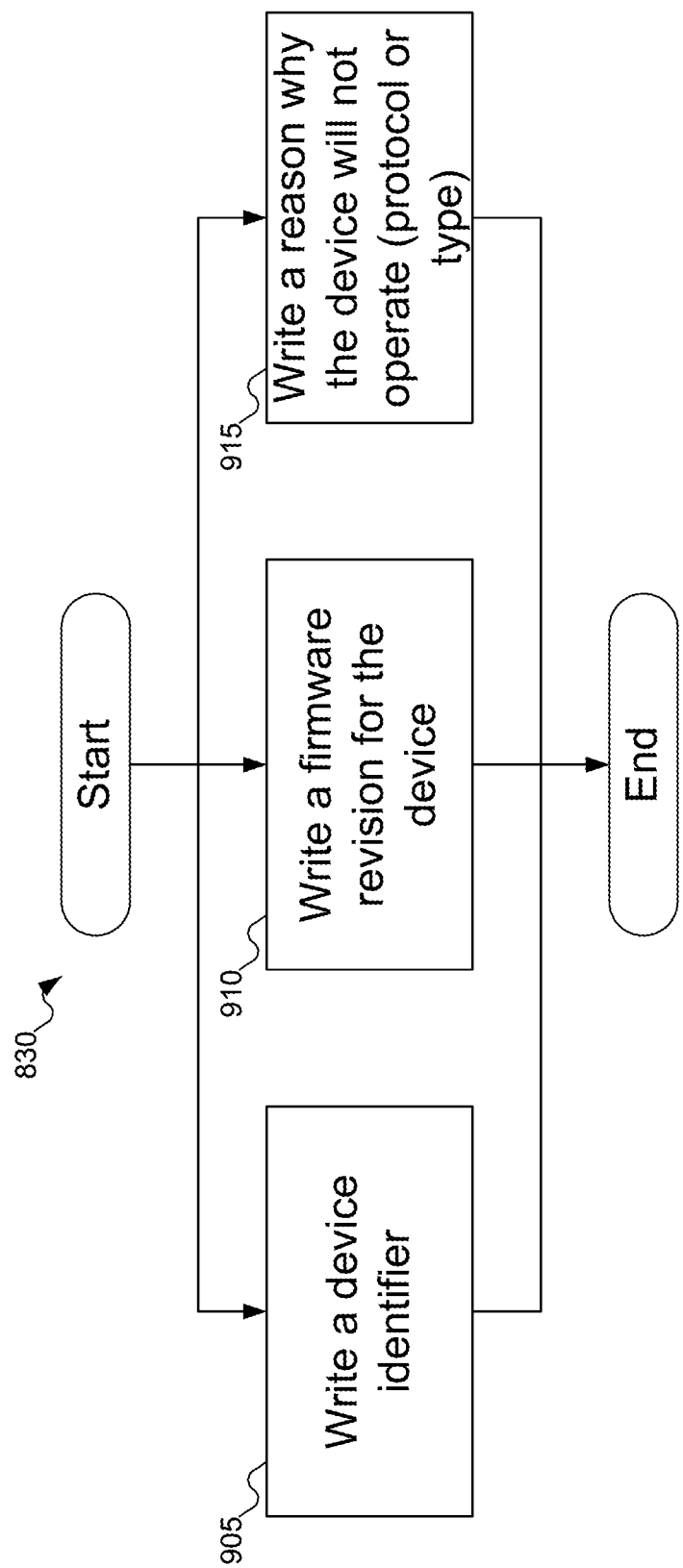
FIG. 9 shows a flowchart of an example procedure for the VPD writing logic of FIG. 3 to write information to the Vital Product Data of FIG. 1.

FIG. 9 shows a flowchart of an example procedure for VPD writing logic 320 of FIG. 3 to write information to Vital Product Data 130 of FIG. 1, according to an embodiment of the inventive concept. In FIG. 9, at block 905, VPD writing logic 320 of FIG. 3 may write device identifier 450 of FIG. 4 to Vital Product Data 130 of FIG. 1. Alternatively or additionally, at block 910, VPD writing logic 320 of FIG. 3 may write device firmware revision 455 of FIG. 4 to Vital Product Data 130 of FIG. 1. Alternatively or additionally, at block 915, VPD writing logic 320 of FIG. 3 may write incompatibility information 435 of FIG. 4 to Vital Product Data 130 of FIG. 1, indicating why device 125 of FIG. 1 will not operate in chassis 105 of FIG. 1.

In FIGS. 7A-9, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a device, comprising:
  an interface to a chassis, the interface capable of supporting a plurality of transport protocols for communicating between the storage device and the chassis;
  a VPD reading logic to read a Vital Product Data from the chassis; and
  a built-in self-configuration logic to configure the interface to use one of the plurality of transport protocols and to disable alternative transport protocols of the plurality of transport protocols responsive to the Vital Product Data.

Statement 2. An embodiment of the inventive concept includes a device according to statement 1, wherein the device includes a Network Interface Card (NIC).

Statement 3. An embodiment of the inventive concept includes a device according to statement 1, wherein:
  the device includes a storage device; and
  the storage device further includes storage for data.

Statement 4. An embodiment of the inventive concept includes a device according to statement 3, wherein the plurality of transport protocols include Ethernet, Fibre Channel, and InfiniBand.

Statement 5. An embodiment of the inventive concept includes a device according to statement 4, wherein the plurality of transport protocols further includes a transport sub-protocol drawn from a set including Remote Direct Memory Access (RDMA) over Converged Ethernet (RoCE) and iWarp.

Statement 6. An embodiment of the inventive concept includes a device according to statement 3, wherein the interface includes a Non-Volatile Memory Express over Fabric (NVMeoF) interface.

Statement 7. An embodiment of the inventive concept includes a device according to statement 3, further comprising VPD writing logic to write information to the Vital Product Data.

Statement 8. An embodiment of the inventive concept includes a device according to statement 7, wherein the information written to the Vital Product Data includes at least one of a protocol incompatibility between the storage device and chassis, and an incorrect type of storage device.

Statement 9. An embodiment of the inventive concept includes a non-transitory memory for storing a Vital Product Data, comprising:
  a data structure stored in said non-transitory memory, said data structure including:
    a first storage for a transport protocol to be used by a device, the transport protocol drawn from a set including Ethernet, Fibre Channel, InfiniBand, and Non-Volatile Memory Express (NVMe);
    a second storage for a first data written by the device, the first data specifying an identifier for the device; and
    a third storage for data written by the device, the data specifying a reason why the device might not operate within a chassis.

Statement 10. An embodiment of the inventive concept includes a non-transitory memory according to statement 9, wherein the data structure further includes a fourth storage for a transport sub-protocol to be used by the device, the transport sub-protocol drawn from a set including Remote Direct Memory Access (RDMA) over Converged Ethernet (RoCE) and iWarp.

Statement 11. An embodiment of the inventive concept includes a non-transitory memory according to statement 9, wherein the data structure further includes a fifth storage to store a firmware revision of the chassis.

Statement 12. An embodiment of the inventive concept includes a non-transitory memory according to statement 9, wherein the data structure further includes a sixth storage to store a firmware revision of the device.

Statement 13. An embodiment of the inventive concept includes a method, comprising:
  requesting by a device a Vital Product Data from a chassis;
  receiving at the device the Vital Product Data from the chassis;
  identifying a transport protocol to use responsive to the Vital Product Data; and
  configuring the device to use the identified transport protocol and disabling alternative transport protocols in the device.

Statement 14. An embodiment of the inventive concept includes a method according to statement 13, wherein:
   requesting by a device a Vital Product Data from a chassis includes requesting by a storage device the Vital Product Data from the chassis;
   receiving at the device the Vital Product Data from the chassis includes receiving at the storage device the Vital Product Data from the chassis; and
   configuring the device to use the identified transport protocol and disabling alternative transport protocols in the storage device includes configuring the storage device to use the identified transport protocol and disabling alternative transport protocols in the storage device.

Statement 15. An embodiment of the inventive concept includes a method according to statement 14, wherein the transport protocol to use drawn from a set including Ethernet, Fibre Channel, and InfiniBand.

Statement 16. An embodiment of the inventive concept includes a method according to statement 15, wherein identifying a transport protocol to use responsive to the Vital Product Data further includes identifying a transport subprotocol to use responsive to the Vital Product Data drawn from a set further including Remote Direct Memory Access (RDMA) over Converged Ethernet (RoCE) and iWarp.

Statement 17. An embodiment of the inventive concept includes a method according to statement 14, further comprising writing information by the storage device to the Vital Product Data.

Statement 18. An embodiment of the inventive concept includes a method according to statement 17, wherein the information may include at least one of a device identifier, a reason why the storage device does not operate in the chassis, and a firmware revision of the storage device.

Statement 19. An embodiment of the inventive concept includes a method according to statement 18, wherein the reason why the storage device does not operate in the chassis may include at least one of a protocol incompatibility between the storage device and chassis, and an incorrect type of storage device.

Statement 20. An embodiment of the inventive concept includes a method according to statement 14, wherein:
   requesting by a storage device a Vital Product Data from a chassis includes requesting by the storage device the Vital Product Data from a chassis over a Non-Volatile Memory Express over Fabric (NVMeoF) interface; and
   receiving at the storage device the Vital Product Data from the chassis includes receiving at the storage device the Vital Product Data from the chassis over the NVMeoF interface.

Statement 21. An embodiment of the inventive concept includes an article, comprising a tangible storage medium, the tangible storage medium having stored thereon non-transitory instructions that, when executed by a machine, result in:
   requesting by a device a Vital Product Data from a chassis;
   receiving at the device the Vital Product Data from the chassis;
   identifying a transport protocol to use responsive to the Vital Product Data; and
   configuring the device to use the identified transport protocol and disabling alternative transport protocols in the device.

Statement 22. An embodiment of the inventive concept includes an article according to statement 21, wherein:
   requesting by a device a Vital Product Data from a chassis includes requesting by a storage device the Vital Product Data from the chassis;
   receiving at the device the Vital Product Data from the chassis includes receiving at the storage device the Vital Product Data from the chassis; and
   configuring the device to use the identified transport protocol and disabling alternative transport protocols in the storage device includes configuring the storage device to use the identified transport protocol and disabling alternative transport protocols in the storage device.

Statement 23. An embodiment of the inventive concept includes an article according to statement 22, wherein the transport protocol to use drawn from a set including Ethernet, Fibre Channel, and InfiniBand.

Statement 24. An embodiment of the inventive concept includes an article according to statement 23, wherein identifying a transport protocol to use responsive to the Vital Product Data further includes identifying a transport subprotocol to use responsive to the Vital Product Data drawn from a set further including Remote Direct Memory Access (RDMA) over Converged Ethernet (RoCE) and iWarp.

Statement 25. An embodiment of the inventive concept includes an article according to statement 22, the tangible storage medium having stored thereon further non-transitory instructions that, when executed by the machine, result in:
   writing information by the storage device to the Vital Product Data.

Statement 26. An embodiment of the inventive concept includes an article according to statement 25, wherein the information may include at least one of a device identifier, a reason why the storage device does not operate in the chassis, and a firmware revision of the storage device.

Statement 27. An embodiment of the inventive concept includes an article according to statement 26, wherein the reason why the storage device does not operate in the chassis may include at least one of a protocol incompatibility between the storage device and chassis, and an incorrect type of storage device.

Statement 28. An embodiment of the inventive concept includes an article according to statement 22, wherein:
   requesting by a storage device a Vital Product Data from a chassis includes requesting by the storage device the Vital Product Data from a chassis over a Non-Volatile Memory Express over Fabric (NVMeoF) interface; and
   receiving at the storage device the Vital Product Data from the chassis includes receiving at the storage device the Vital Product Data from the chassis over the NVMeoF interface.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:
1. A device, comprising:
   a physical interface to a host machine, the physical interface supporting at least a first transport protocol and a second transport protocol for communicating between the device and the host machine;

a circuit to identify a configuration of the host machine, the configuration including the first transport protocol intended to be used by the host machine to communicate with the device;

a self-configuration logic to configure the physical interface to lock the physical interface to the first transport protocol responsive to the configuration; and a writing logic to write information by the device, wherein the device is installed in the host machine, and wherein the information written to the device includes a device incompatibility between the device and the host machine.

2. A device according to claim 1, wherein the first transport protocol and the second transport protocol are drawn from a set including Ethernet, Fibre Channel, and InfiniBand, Non-Volatile Memory Express (NVMe), and NVMe over Fabrics (NVMe-oF).

3. A device according to claim 2, wherein the first transport protocol and the second transport protocol are drawn from the set further including Remote Direct Memory Access (RDMA) over Converged Ethernet (ROCE) and iWarp.

4. A device according to claim 1, wherein the information written to the device further includes a protocol incompatibility between the device and host machine.

5. A non-transitory memory for storing a data, comprising:

a data structure stored in said non-transitory memory, said data structure including:

a first storage for a transport protocol to be used by a device to communicate with a host machine, the transport protocol drawn from a set including Ethernet, Fibre Channel, InfiniBand, Non-Volatile Memory Express (NVMe), and NVMe over Fabrics (NVMe-oF);

a second storage for a first data written by the device, the first data specifying an identifier for the device; and a third storage for data written by the device, the data specifying a reason why the device has a device incompatibility with the host machine, wherein the device is installed in the host machine.

6. A non-transitory memory according to claim 5, wherein the data specifying a second reason why the device has a protocol incompatibility with host machine.

7. A non-transitory memory according to claim 5, wherein the data structure further includes a third storage for a transport sub-protocol to be used by the device, the transport sub-protocol drawn from a set including Remote Direct Memory Access (RDMA) over Converged Ethernet (RoCE) and iWarp.

8. A non-transitory memory according to claim 5, wherein the data structure further includes a third storage to store a firmware revision of the host machine.

9. A non-transitory memory according to claim 5, wherein the data structure further includes a third storage to store a firmware revision of the device.

10. A method, comprising:

requesting a configuration of a host machine over a physical interface by a device, the device capable of using a first transport protocol or a second transport protocol to communicate with the host machine;

receiving at the device the configuration of the host machine over the physical interface;

identifying the first transport protocol to use responsive to the configuration;

configuring the device to lock the physical interface to the first transport protocol; and writing information by the device, wherein the device is installed in the host machine, and wherein the information written to the device includes a device incompatibility between the device and the host machine.

11. A method according to claim 10, wherein the first transport protocol and the second transport protocol are drawn from a set including Ethernet, Fibre Channel, InfiniBand, Non-Volatile Memory Express (NVMe), and NVMe over Fabrics (NVMe-oF).

12. A method according to claim 11, wherein identifying a first transport protocol to use responsive to the data further includes identifying a transport sub-protocol to use responsive to the data, the transport sub-protocol drawn from a set further including Remote Direct Memory Access (RDMA) over Converged Ethernet (ROCE) and iWarp.

13. A method according to claim 10, wherein the information further includes at least one of a device identifier, a reason why the device has a protocol incompatibility with the host machine, and a firmware revision of the device.

* * * * *